US008846821B2

(12) United States Patent
Doumae et al.

(10) Patent No.: US 8,846,821 B2
(45) Date of Patent: Sep. 30, 2014

(54) METAL-CROSSLINKED ORGANOPOLYSILOXANE-THIO BLOCK VINYL COPOLYMER AND ANTIFOULING COATING COMPOSITION CONTAINING THE METAL-CROSSLINKED COPOLYMER

(75) Inventors: Takaharu Doumae, Otake (JP); Yoshio Yamada, Otake (JP); Masaaki Oya, Otake (JP); Fumio Hamazu, Otake (JP); Makoto Tsuboi, Otake (JP)

(73) Assignee: Chugoku Marine Paints, Ltd., Otake-shi (JP)

( * ) Notice: Subject to any disclaimer, the term of this patent is extended or adjusted under 35 U.S.C. 154(b) by 165 days.

(21) Appl. No.: 13/516,406

(22) PCT Filed: Dec. 16, 2010

(86) PCT No.: PCT/JP2010/072605

§ 371 (c)(1), (2), (4) Date: Jun. 15, 2012

(87) PCT Pub. No.: WO2011/074620

PCT Pub. Date: Jun. 23, 2011

(65) Prior Publication Data

US 2012/0258321 A1 Oct. 11, 2012

(30) Foreign Application Priority Data

Dec. 18, 2009 (JP) ................................ 2009-287771

(51) Int. Cl.

| | |
|---|---|
| ***C08F 8/42*** | (2006.01) |
| ***C08J 3/24*** | (2006.01) |
| ***C08F 290/14*** | (2006.01) |
| ***C08G 77/442*** | (2006.01) |
| ***C09D 5/16*** | (2006.01) |
| ***C09D 151/08*** | (2006.01) |
| ***C08L 51/08*** | (2006.01) |
| ***C09D 183/10*** | (2006.01) |
| *C08K 3/00* | (2006.01) |

(52) U.S. Cl.

CPC .......... *C08G 77/442* (2013.01); *C08F 290/148* (2013.01); *C09D 5/1675* (2013.01); *C09D 151/085* (2013.01); *C08K 3/0075* (2013.01); *C08L 2312/00* (2013.01); *C08L 51/085* (2013.01); *C09D 183/10* (2013.01)

USPC ........... 525/360; 525/370; 525/373; 526/279; 526/303.1; 526/307.6; 526/317.1; 526/318.2; 526/319; 526/328; 526/328.5; 526/332; 526/346; 528/30

(58) Field of Classification Search

None

See application file for complete search history.

(56) References Cited

U.S. PATENT DOCUMENTS

| | | | | |
|---|---|---|---|---|
| 5,032,460 A * | 7/1991 | Kantner et al. | ............... | 428/447 |
| 5,349,004 A * | 9/1994 | Kumar et al. | ................ | 524/461 |
| 5,482,991 A * | 1/1996 | Kumar et al. | ................ | 524/506 |
| 5,514,731 A | 5/1996 | Nakai | | |
| 5,760,136 A | 6/1998 | Kato et al. | | |
| 6,090,871 A * | 7/2000 | Reiners et al. | .................. | 524/27 |
| 6,541,109 B1 * | 4/2003 | Kumar et al. | ................ | 428/352 |
| 7,230,051 B2 | 6/2007 | Gobelt et al. | | |
| 7,928,175 B2 | 4/2011 | Sugihara et al. | | |
| 8,530,545 B2 * | 9/2013 | Kumar et al. | ................ | 523/202 |

FOREIGN PATENT DOCUMENTS

| | | |
|---|---|---|
| JP | 6-104793 B2 | 12/1994 |
| JP | 7-305001 A | 11/1995 |
| JP | 8-134153 A | 5/1996 |
| JP | 9-235334 A | 9/1997 |
| JP | 2001-72869 A | 3/2001 |
| JP | 2002-327064 A | 11/2002 |
| JP | 2003-55419 A | 2/2003 |
| JP | 2003-238886 A | 8/2003 |
| JP | 2004-43804 A | 2/2004 |
| JP | 2006-77095 A | 3/2006 |
| JP | 2008-1896 A | 1/2008 |
| JP | 4154345 B2 | 7/2008 |

OTHER PUBLICATIONS

International Search Report issued Feb. 1, 2011 in PCT/JP2010/072605.

* cited by examiner

*Primary Examiner* — Marc Zimmer

(74) *Attorney, Agent, or Firm* — Oblon, Spivak, McClelland, Maier & Neustadt, L.L.P.

(57) ABSTRACT

The object of the present invention is to provide a silicone-based copolymer which has excellent long-term antifouling property even in a dry-wet alternate portion of a ship and the like or a portion thereof near the surface of water, is excellent also in mechanical strength and recoatability and exhibits high antifouling performance even if an antifouling agent is not added, and an antifouling coating composition containing the copolymer. The present invention provides, as the silicon-based copolymer, a metal-crosslinked organopolysiloxane-thio block vinyl copolymer [D] wherein an organopolysiloxane-thio block vinyl copolymer [C] having a carboxylic acid-containing vinyl copolymer block [A] formed from constitutional units derived from a polymerizable unsaturated carboxylic acid (a1) and constitutional units derived from at least one other polymerizable unsaturated monomer (a2) copolymerizable with the polymerizable unsaturated carboxylic acid, and a specific organopolysiloxane-thio block [B] is crosslinked with a divalent metal [M].

20 Claims, 16 Drawing Sheets

METAL-CROSSLINKED ORGANOPOLYSILOXANE-THIO BLOCK VINYL COPOLYMER AND ANTIFOULING COATING COMPOSITION CONTAINING THE METAL-CROSSLINKED COPOLYMER

TECHNICAL FIELD

The present invention relates to a metal-crosslinked copolymer having a hydrophilic/hydrophobic structure and an antifouling coating composition containing the metal-crosslinked copolymer.

BACKGROUND ART

If various aquatic organisms, e.g., animals such as oysters, mussels and barnacles, and plants such as layer, adhere and propagate on the surfaces of water-contact portions of ships, fishing nets, marine structures such as supply and drainpipes for seawater, etc., appearances of the ships, etc. are marred and functions thereof are sometimes impaired. Especially when such aquatic organisms adhere and propagate on a ship's bottom, surface roughness of the ship's bottom is increased to sometimes induce lowering of velocity of the ship and increase of fuel cost.

In order to prevent such damages, the surfaces of the above substrates are coated with various antifouling coating materials. For the exhibition of antifouling effects, physiologically active substances (e.g., organotin compound) have been added to the antifouling coating materials in the past. However, problems on the safety in the coating working and the environmental safety have been recognized, and development of antifouling coating materials capable of preventing adhesion of aquatic organisms without using such physiologically active substances has been promoted.

For example, in patent literatures 1 and 2, an organopolysiloxane-thio block vinyl copolymer formed from a polyoxyalkylene group-containing vinyl copolymer block and a specific organopolysiloxane-thio block, and an antifouling coating composition containing the copolymer and silicone oil are described.

In a patent literature 3, an antifouling coating material obtained by adding polyether modified silicone oil having HLB of 3 to 12 to a non-silicone based film-forming resin is described.

In a patent literature 4, a copolymer containing both-end (meth)acrylic modified silicon-containing polymerizable monomer units and metal atom-containing polymerizable monomer units containing a divalent metal atom, and a coating composition containing the copolymer are described.

In patent literatures 5 and 6, a polysiloxane/acrylic resin block copolymer having a crosslinked structure due to a given metal and an antifouling coating composition containing the copolymer are described.

In patent literatures 7 and 8, a graft copolymer comprising (meth)acrylic group-containing polyether modified silicone and another polymerizable monomer, and a coating composition containing the copolymer are described.

CITATION LIST

Patent Literature

Patent literature 1: JP 2002-327064 A
Patent literature 2: JP 2008-1896 A
Patent literature 3: JP 1994-104793 B2
Patent literature 4: JP 4,154,345 B2
Patent literature 5: JP 2001-72869 A
Patent literature 6: JP 2006-77095 A
Patent literature 7: JP 1996-134153
Patent literature 8: JP 1995-305001

SUMMARY OF INVENTION

Technical Problem

In the conventional silicon-based antifouling coating materials, various problems have been left. In particular, antifouling coating films formed from the antifouling coating compositions described in the above patent literatures 1 to 3 are inferior in long-term antifouling property in dry-wet alternate portions of ships or the like and portions thereof near the surface of water though they exhibit certain antifouling performance in portions that are always submerged, so that an antifouling action over a long period of time cannot be expected. In the antifouling coating composition described in the patent literature 3, compatibility of the non-silicone based film-forming resin with the polyether modified silicone oil is bad, and oil bleeding markedly occurs, so that the antifouling property cannot be maintained over a long period of time. The antifouling coating composition containing a polysiloxane/acrylic resin block copolymer, which is described in the patent literature 5 or 6, does not exert satisfactory antifouling effect unless an antifouling agent is further added, and long-term antifouling property cannot be maintained. Also the antifouling coating composition containing a graft copolymer, which is described in the patent literature 7 or 8, is insufficient in the long-term antifouling property, and the composition is insufficient also in physical properties such as crack resistance and strength of its coating film.

It is an object of the present invention to provide a silicone-based copolymer which has solved such problems as above, has excellent long-term antifouling property even in a dry-wet alternate portion of a ship or the like and a portion thereof near the surface of water, is excellent also in mechanical strength and recoatability, and exhibits high antifouling performance even if an antifouling agent is not added, and an antifouling coating composition containing the copolymer as a vehicle.

Solution to Problem

There is provided by the present invention a metal-crosslinked organopolysiloxane-thio block vinyl copolymer [D] having a structure in which an organopolysiloxane-thio block vinyl copolymer [C] having a carboxylic acid-containing vinyl copolymer block [A] formed from constitutional units derived from a polymerizable unsaturated carboxylic acid (a1) and constitutional units derived from at least one other polymerizable unsaturated monomer (a2) copolymerizable with the polymerizable unsaturated carboxylic acid, and an organopolysiloxane-thio block [B] represented by the following formula [I] is crosslinked with a divalent metal [M],

[I]

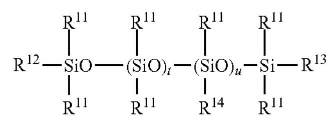

wherein each $R^{11}$ is independently a hydrocarbon group of 1 to 10 carbon atoms, $R^{12}$, $R^{13}$ and $R^{14}$ are each independently $R^{11}$ or a divalent thio organic group of 1 to 20 carbon atoms (with the proviso that at least one of $R^{12}$, $R^{13}$ and $R^{14}$ is a divalent thio organic group of 1 to 20 carbon atoms), t is an integer of not less than 0, and u is an integer of not less than 1.

The polymerizable unsaturated carboxylic acid (a1) is preferably at least one selected from (meth)acrylic acid, maleic acid, fumaric acid, itaconic acid, citraconic acid and undecylenic acid.

The polymerizable unsaturated monomer (a2) is preferably a polymerizable unsaturated carboxylic acid ester (a21), or a combination of a polymerizable unsaturated carboxylic acidester (a21) and polymerizable group-containing polyether modified silicone (a22).

The polymerizable unsaturated carboxylic acid ester (a21) is preferably at least one selected from (meth)acrylic acid esters, styrenes, vinyl esters, (meth)acrylamides and vinyl ethers.

The HLB of the polymerizable group-containing polyether modified silicone (a22) is preferably not more than 18.

The acid value of the organopolysiloxane-thio block vinyl copolymer [C] is preferably in the range of 1 to 200.

The glass transition temperature (Tg) of the organopolysiloxane-thio block vinyl copolymer [C] is preferably in the range of −50° C. to 60° C.

The weight-average molecular weight (Mw) of the organopolysiloxane-thio block vinyl copolymer [C] is preferably in the range of 1,000 to 200,000.

The divalent metal [M] is preferably at least one selected from zinc, copper, cobalt, nickel, manganese, magnesium and calcium.

The metal-crosslinked organopolysiloxane-thio block vinyl copolymer [D] is preferably a copolymer wherein the proportion occupied by the carboxylic acid-containing vinyl copolymer block [A] is in the range of 5 to 98.5% by weight, the proportion occupied by the organopolysiloxane-thio block [B] is in the range of 1 to 80% by weight, and the proportion occupied by the divalent metal is in the range of 0.5 to 16% by weight, in 100% by weight of the solids content.

The metal-crosslinked organopolysiloxane-thio block vinyl copolymer [D] preferably has a viscosity of 50 to 100,000 mPa·s/25° C. in the case of a nonvolatile content of 50% by weight.

There is also provided a metal-crosslinked organopolysiloxane-thio block vinyl copolymer composition characterized by comprising the metal-crosslinked organopolysiloxane-thio block vinyl copolymer [D] and a water-repellent component and/or a hydrophilic component. The water-repellent component is preferably at least one selected from dimethyl silicone oil, methyl phenyl silicone oil, fluorine-containing silicone oil, fluorine oil and paraffins. The hydrophilic component is preferably polyether modified silicone oil having HLB of not more than 12.

Moreover, there is also provided an antifouling coating composition characterized by comprising the metal-crosslinked organopolysiloxane-thio block vinyl copolymer [D] or the metal-crosslinked organopolysiloxane-thio block vinyl copolymer composition. To this antifouling coating composition, an antifouling agent may be further added.

There are also provided by the present invention an antifouling coating film formed from the metal-crosslinked organopolysiloxane-thio block vinyl copolymer composition or the antifouling coating composition; a substrate with a coating film, having a substrate whose surface is coated with a coating film obtained by curing the metal-crosslinked organopolysiloxane-thio block vinyl copolymer composition or the antifouling coating composition; an underwater structure having a substrate whose surface is coated with the antifouling coating film, and a ship having a ship substrate whose surface is coated with the antifouling coating film.

In another aspect of the present invention, there is provided a method for preventing fouling of a substrate, comprising coating a surface of a substrate with the antifouling coating film.

In a further aspect of the present invention, there is provided a process for preparing the metal-crosslinked organopolysiloxane-thio block vinyl copolymer [D], comprising mixing the organopolysiloxane-thio block vinyl copolymer [C] with at least one compound selected from an oxide, a hydroxide, a chloride and an organic carboxylate of the divalent metal [M] to subject them to metal esterification reaction.

Advantageous Effects of Invention

The antifouling coating composition containing the metal-crosslinked organopolysiloxane-thio block vinyl copolymer [D] of the present invention can form an antifouling coating film having excellent long-term antifouling property even in a dry-wet portion of a ship or the like and a portion thereof near the surface of water where characteristic lowering of performance of conventional silicone-based antifouling coating materials has been observed. Since it is unnecessary to add poisons such as an organotin compound to such an antifouling coating composition, the coating working environment can be improved, and this composition is excellent also in environmental safety.

DESCRIPTION OF EMBODIMENTS

Metal-Crosslinked Organopolysiloxane-Thio Block Vinyl Copolymer

Figure 1:
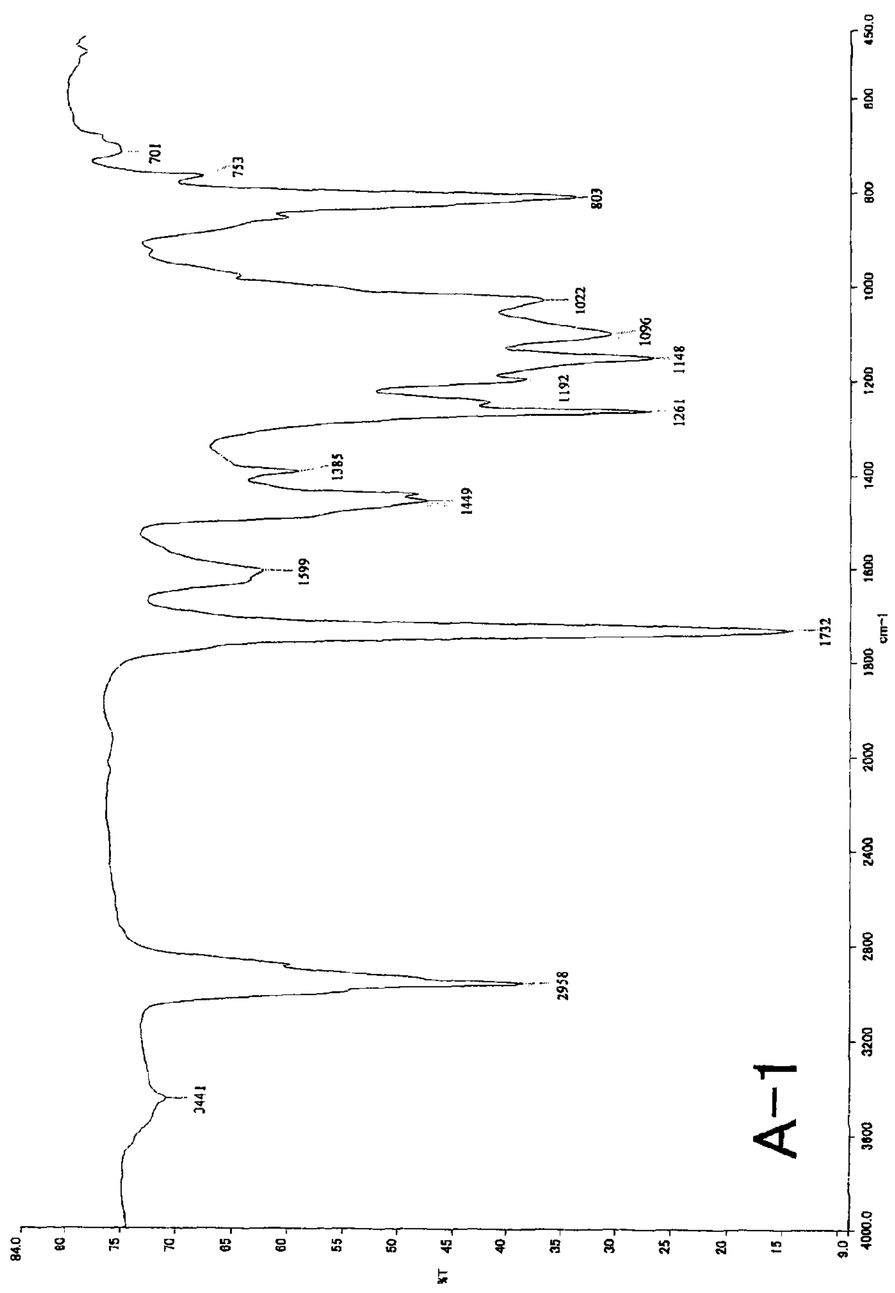
FIG. 1 is a chart of an IR spectrum of a metal-crosslinked copolymer A-1 (Example 1).

The metal-crosslinked organopolysiloxane-thio block vinyl copolymer [D] of the present invention is a compound having a structure in which an organopolysiloxane-thio block vinyl copolymer [C] that is formed from a carboxylic acid-containing vinyl copolymer block [A] formed from constitutional units derived from a polymerizable unsaturated carboxylic acid (a1) and constitutional units derived from at least one other polymerizable unsaturated monomer (a2) copolymerizable with the polymerizable unsaturated carboxylic acid, and a specific organopolysiloxane thio block [B] is crosslinked with a divalent metal [M].

In 100% by weight of the metal-crosslinked organopolysiloxane-thio block vinyl copolymer [D] (solids content), the proportion occupied by the carboxylic acid-containing vinyl copolymer block [A] is preferably in the range of 5 to 98.5% by weight, more preferably 10 to 94% by weight, the proportion occupied by the organopolysiloxane-thio block [B] is preferably in the range of 1 to 80% by weight, more preferably 5 to 50% by weight, and the proportion occupied by the divalent metal is preferably in the range of 0.5 to 16% by weight, more preferably 1 to 10% by weight.

The proportion of the carboxylic acid-containing vinyl copolymer block [A], the proportion of the organopolysiloxane-thio block [B] and the proportion of the divalent metal [M] are based on the weights of the polymerizable unsaturated carboxylic acid (a1) and the polymerizable unsaturated monomer (a2), the weight of the mercapto modified polyorganosiloxane [B], and the weight of the divalent metal [M] in the metal compound, respectively, said components (a1), (a2) and [B] and the metal compound being used as raw materials for preparing the metal-crosslinked organopolysiloxane-thio block vinyl copolymer [D] or the organopolysiloxane-thio block vinyl copolymer [C] that is a precursor of the copolymer [D].

From the viewpoints of coating film strength, long-lasting antifouling performance and handling of copolymer solution, the viscosity of the metal-crosslinked organopolysiloxane-thio block vinyl copolymer [D] is preferably in the range of 50 to 100,000 mPa·s/25° C., more preferably 100 to 50,000 mPa·s/25° C., in the case of a nonvolatile content of 50% by weight. If the viscosity is less than 50 mPa·s/25° C., coating film strength is lowered and exhibition of long-lasting antifouling performance becomes difficult. If the viscosity is more than 100,000 mPa·s/25° C., solution fluidity becomes insufficient, so that handling becomes difficult and antifouling property tends to be deteriorated. Moreover, a large amount of a solvent is necessary in the preparation of a coating material. The "nonvolatile content" in the present invention refers to a heating residue after drying for 3 hours in a hot air dryer at 108° C., as described in the later-described examples, and the "solids content" can have the same meaning as this.

As the divalent metal [M] to crosslink the organopolysiloxane-thio block vinyl copolymer [C], zinc, copper, cobalt, nickel, manganese, magnesium or calcium is preferable, and zinc or copper is particularly preferable.

[C] Organopolysiloxane-Thio Block Vinyl Copolymer

The organopolysiloxane-thio block vinyl copolymer [C] formed from a carboxylic acid-containing vinyl copolymer block [A] and an organopolysiloxane-thio block [B] is a compound which should be called a precursor of the metal-crosslinked organopolysiloxane-thio block vinyl copolymer [D].

From the viewpoints of consumption of coating film and water resistance of coating film, the acid value of the organopolysiloxane-thio block vinyl copolymer [C] is preferably in the range of 1 to 200, more preferably 10 to 120.

From the viewpoints of coating film hardness and coating film physical properties, the glass transition temperature (Tg) of the organopolysiloxane-thio block vinyl copolymer [C] is preferably in the range of −50° C. to 60° C., more preferably −30° C. to 40° C.

The weight-average molecular weight (Mw) of the organopolysiloxane-thio block vinyl copolymer [C] is preferably in the range of 1,000 to 200,000, more preferably 2,000 to 50,000, still more preferably 3,000 to 20,000. When the organopolysiloxane-thio block vinyl copolymer [C] having a weight-average molecular weight of such a range is used as a precursor, a metal-crosslinked copolymer [D] having a viscosity suitable for handling in the case of a proper concentration of a solution or an antifouling coating composition can be prepared, and a coating film formed from an antifouling coating composition containing such a metal-crosslinked copolymer [D] has a proper strength and tends to exhibit excellent long-lasting antifouling performance.

[A] Carboxylic Acid-Containing Vinyl Copolymer Block

The carboxylic acid-containing vinyl copolymer block [A] is constituted of constitutional units derived from a polymerizable unsaturated carboxylic acid monomer (a1) and constitutional units derived from at least one other polymerizable unsaturated monomer (a2) copolymerizable with the polymerizable unsaturated carboxylic acid.

(a1) Polymerizable Unsaturated Carboxylic Acid

As the polymerizable unsaturated carboxylic acid (a1), any of hitherto publicly known various monomers having a carboxyl group and a polymerizable double bond can be used. Examples of such monomers include (meth)acrylic acid, dibasic acids, such as maleic acid, fumaric acid, itaconic acid and citraconic acid, monobasic acids of monoesters of these dibasic acids, undecylenic acid, and a polymerizable unsaturated carboxylic acid compound obtained by ring-opening addition of an acid anhydride to a polymerizable hydroxyl group-containing compound. In the present invention, the "(meth)acrylic acid" is a generic name of "acrylic acid" and "methacrylic acid", and the same shall apply to the term "(meth)acrylate" derived from it.

(a2) Polymerizable Unsaturated Monomer

The other polymerizable unsaturated monomer (a2) copolymerizable with the polymerizable unsaturated carboxylic acid (a1) includes a polymerizable unsaturated carboxylic acid ester (a21) and polymerizable group-containing polyether modified silicone (a22). As the polymerizable unsaturated monomer (a2), the polymerizable unsaturated carboxylic acid ester (a21) may be used alone, or the polymerizable unsaturated carboxylic acid ester (a21) and the polymerizable group-containing polyether modified silicone (a22) may be used in combination.

(a21) Polymerizable Unsaturated Carboxylic Acid Ester

Examples of the polymerizable unsaturated carboxylic acid esters (a21) include the following compounds:

aliphatic, alicyclic or aromatic (meth)acrylic acid esters which have about 1 to 30 carbon atoms and may have a hydroxyl group, silicon or fluorine, such as:

methyl(meth)acrylate, ethyl(meth)acrylate, n-propyl(meth)acrylate, isopropyl(meth)acrylate, n-butyl(meth)acrylate, isobutyl(meth)acrylate, t-butyl(meth)acrylate, 2-ethylhexyl(meth)acrylate, cyclohexyl(meth)acrylate, tetrahydrofurfuryl(meth)acrylate, stearyl(meth)acrylate, lauryl(meth)acrylate, benzyl(meth)acrylate, dodecyl(meth)acrylate, hexadecyl(meth)acrylate, octadecyl(meth)acrylate, methoxyethyl(meth)acrylate, 2-hydroxyethyl(meth)acrylate, 2-hydroxypropyl(meth) acrylate, 2-hydroxybutyl(meth)acrylate, 3-hydroxypropyl (meth)acrylate, 4-hydroxybutyl(meth)acrylate, (poly)caprolatone(meth)acrylate, (meth)acryloxypropyl polydimethylsiloxane, 3-[tris(trimethylsiloxy)silyl]propyl(meth)acrylate, 2,2,2-trifluoroethyl (meth)acrylate, and 1H,1H,2H,2H-heptadecafluorodecyl (meth)acrylate;

styrenes, such as styrene and α-methylstyrene;

vinyl esters, such as vinyl acetate and vinyl propionate;

(meth)acrylamides, such as N,N-dimethylacrylamide and dimethylaminoethylacrylamide; and vinyl ethers, such as ethyl vinyl ether and isobutyl vinyl ether.

These compounds can be used singly or in combination of two or more kinds, when needed.

When both-end (meth)acryloxysilicone having silicone (e.g., α,ω-bis[(meth)acryloxypropyl]polydimethylsiloxane) is used as the polymerizable unsaturated carboxylic acid ester (a21), coating film durability can be improved by virtue of increase of the crosslink density. The examples include "FM-7711", "FM-7721" and "FM-7725" (trade names, available from Chisso Corporation), "X-22-164", "X-22-164AS", "X-22-164A", "X-22-164B", "X-22-164C" and "X-22-164E" (trade names, available from Shin-Etsu Chemical Co., Ltd.), and "TSL9706" (available from Momentive Performance Materials Japan LLC).

(a22) Polymerizable Group-Containing Polyether Modified Silicone

As the polymerizable group-containing polyether modified silicone (a22), polymerizable group-containing polyether modified silicone [A] described in the aforesaid patent literature 2 (JP 2008-1896) or the like can be more specifically used.

That is to say, as the polymerizable group-containing polyether modified silicone (a22), a silicone comprising constitutional units derived from polyether modified silicone (a221) represented by the following formula [II] and/or constitutional units derived from polyether modified silicone (a222) represented by the following formula [III] can be used.

Each $R^{22}$ is independently a divalent hydrocarbon group of 1 to 6 carbon atoms. Examples of $R^{22}$ include $—CH_2CH_2—$, $—CH_2CH_2CH_2—$, $—CH_2CH_2CH_2CH_2—$, $—CH_2CH_2CH_2CH_2CH_2—$, $—CH_2CH_2CH_2CH_2CH_2CH_2—$ and $—CH_2CH_2CH(CH_3)CH_2CH_2—$. Of these, $—CH_2CH_2—$ and $—CH_2CH_2CH_2—$ are preferable, and $—CH_2CH_2CH_2—$ is particularly preferable.

$R^{23}$ and $R^{24}$ may be the same as or different from each other and are each independently an alkylene group of 2 to 4 carbon atoms. Examples of $R^{23}$ and $R^{24}$ include $—CH_2CH_2—$, $—CH_2CH_2CH_2—$, $—CH_2CH(CH_3)—$, $—CH(CH_3)CH_2—$ and $—CH_2CH_2CH_2CH_2—$. Of these, $—CH_2CH_2—$, $—CH_2CH_2CH_2—$, $—CH_2CH(CH_3)—$ and $—CH(CH_3)CH_2—$ are preferable, and $—CH_2CH_2—$ is particularly preferable.

That is to say, $—(R^{23}—O)_a(R^{24}—O)_b—$ is preferably polyoxyethylene group, polyoxypropylene group, polyether group having both of them, or poly(oxyethyleneoxypropylene) group.

a is the total number of repeating units of $(R^{23}—O)$, b is the total number of repeating units of $(R^{24}—O)$, and they are each independently usually an integer of 1 to 30, preferably an integer of 2 to 20, particularly preferably an integer of 3 to 15. These repeating units may be arranged at random or may be arranged so as to form blocks.

$R^{25}$ is a polymerizable unsaturated hydrocarbon group-containing group. Examples of $R^{25}$ include polymerizable unsaturated hydrocarbon group-containing groups in which the total number of carbon atoms is 2 to 15, preferably 2 to 10, and which may have a substituent, such as $CH_2═CH—$, $CH_2═C(CH_3)—$, $CH_3—CH═CH—$, $CH_3—CH═C(CH_3)—$, $HOCOCH═CH—$ and $CH_3OCOCH═CH—$. In other words, $—OCOR^{25}$ represents a polymerizable unsaturated carboxylic acid residue (polymerizable unsaturated group-containing carbonyloxy group). As examples of $—OCOR^{25}$ (i.e., $R^{25}COO—$), acryloyloxy group ($CH_2═CHCOO—$) and methacryloyloxy group ($CH_2═C(CH_3)COO═$) can be mentioned. In addition, polymerizable unsaturated carboxylic acid residues in which the total number of carbon atoms is 3 to 16, preferably 3 to 11, and which may have a substituent (e.g., —COOH), for example, groups

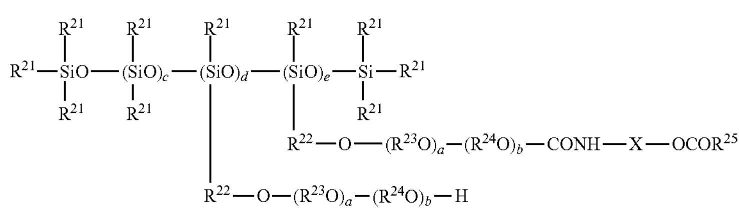

[II]

In the formula [II], c, d and e are each a positive integer indicating the total number of the respective repeating units. These repeating units may be arranged at random or may be arranged so as to form blocks.

Each $R^{21}$ is independently an unsubstituted or substituted monovalent hydrocarbon group of 1 to 8 carbon atoms. Examples of include alkyl groups, such as methyl group, ethyl group, propyl group, butyl group, pentyl group and hexyl group; cycloalkyl groups, such as cyclopentyl group and cyclohexyl group; aryl groups, such as phenyl group and tolyl group; aralkyl groups, such as benzyl group and 2-phenylethyl group; and halogenated alkyl groups, such as 3,3,3-trifluoropropyl group and 3-chloropropyl group. Of these, methyl group, ethyl group, phenyl group, vinyl group and 2-phenylethyl group are preferable, and methyl group is particularly preferable. It is particularly preferable that all of $R^{21}$ are methyl groups.

derived from dibasic polymerizable unsaturated carboxylic acids, such as maleinoyloxy group ($HOOCCH═CHCOO—$, cis) and fumaroyloxy group ($HOOCCH═CHCOO—$, trans), and esters thereof can be also mentioned.

X is a divalent hydrocarbon group or —YNHCOOZ—, Y is a diisocyanate compound residue, and Z is a divalent hydrocarbon group.

The number of carbon atoms of X is usually 1 to 8, preferably 1 to 4, and the number of carbon atoms of Z is usually 1 to 12, preferably 2 to 6.

The diisocyanate compound of Y may be aliphatic, aromatic or alicyclic isocyanate or a both-end reactive isocyanate oligomer, and examples thereof include diphenylmethane diisocyanate (MDI), tolylene diisocyanate (TDI), xylylene diisocyanate (XDI), 1,5-naphthalene diisocyanate (NDI), p-phenylene diisocyanate, trans-1,4-cyclohexane diisocyanate (CHDI), 1,3-bis(isocyanatomethyl-benzene), 4,4'-dicyclohexylmethane diisocyanate (H12MDI), 1,3-bis(isocyanatomethyl)-cyclohexane (H6XDI), hexamethylene diisocyanate (HDI), isophorone diisocyanate (IPDI), meta-tetramethylxylene diisocyanate or para-tetramethylxylene diisocyanate (m-TMXDI, p-TMXDI), lysine diisocyanate (LDI), and 2,2,4-trimethylhexamethylene diisocyanate. Of these, tolylene diisocyanate (TDI) and isophorone diisocyanate (IPDI) are preferable.

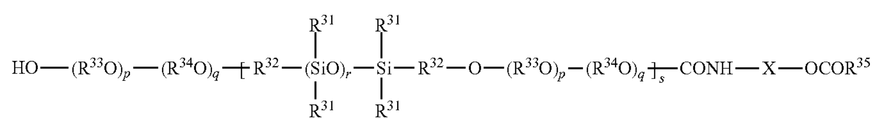

In the formula [III], $R^{31}$, $R^{32}$, $R^{33}$, $R^{34}$ and $R^{35}$ have the same meanings as those of $R^{21}$, $R^{22}$, $R^{23}$, $R^{24}$ and $R^{25}$ in the formula [II], respectively.

p is the total number of repeating units of ($R^{33}$—O), q is the total number of repeating units of ($R^{34}$—O), and they are each independently usually an integer of 1 to 30, preferably an integer of 2 to 20, particularly preferably an integer of 3 to 15. These repeating units may be arranged at random or may be arranged so as to form blocks.

r and s are each also a positive integer indicating the total number of the respective repeating units. These repeating units may be arranged at random or may be arranged so as to form blocks.

The polyether modified silicone (a221) represented by the formula [II] can be prepared by, for example, reacting a compound represented by the following formula [IIa] with a compound represented by the following formula [IIb].

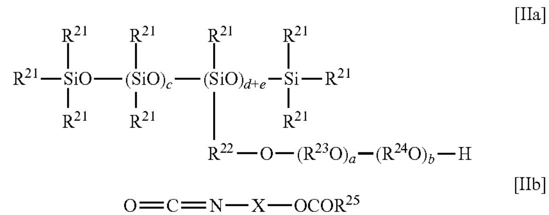

In the formula [IIa] and the formula [IIb], $R^{21}$, $R^{22}$, $R^{23}$, $R^{24}$, $R^{25}$, a, b, c, d and e have the same meanings as meanings of those in the formula [II].

The polyether modified silicone (a222) represented by the formula [III] can be prepared by, for example, reacting a compound represented by the following formula [IIIa] with a compound represented by the following formula [IIIb].

In the formula [IIIa] and the formula [IIIb], $R^{31}$, $R^{32}$, $R^{33}$, $R^{34}$, $R^{35}$, p, q, r and s have the same meanings as meanings of those in the formula [III] (therefore, the formula [IIIb] has the same meaning as that of the formula [IIb]).

Examples of commercially available products of the modified silicones represented by the formula [IIa] include "FZ-2191" (trade name, available from Dow Corning Toray Co., Ltd.), "SH-3771" (trade name, available from Dow Corning Toray Co., Ltd.), and "KF-353A" (trade name, available from Shin-Etsu Chemical Co., Ltd.). Examples of commercially available products of the modified silicones represented by the formula [IIIa] include "SF-8427" (trade name, available from Dow Corning Toray Co., Ltd.).

Of the compounds represented by the formula [IIb] or the formula [IIIb], compounds wherein X is a divalent hydrocarbon group include 2-methacryloyloxyethyl isocyanate, 2-acryloyloxyethyl isocyanate, 2-methacryloyloxymethyl isocyanate, 2-acryloyloxymethyl isocyanate, 2-methacryloyloxybutyl isocyanate and 2-acryloyloxybutyl isocyanate. Of these, 2-methacryloyloxyethyl isocyanate is preferable. Examples of commercially available products of such compounds include "Karenz MOI" (registered trademark, available from Showa Denko K.K.) and "Karenz AOI" (registered trademark, available from Showa Denko K. K.).

On the other hand, compounds wherein X is —YNHCOOZ—, Y is a diisocyanate compound residue, and Z is a divalent hydrocarbon group may be reaction products of the above diisocyante compounds with hydroxyl group-containing (meth)acrylic acid esters. Examples of the hydroxyl group-containing (meth)acrylic acid esters include 2-hydroxyethyl(meth)acrylate, 2-hydroxypropyl(meth)acrylate, 2-hydroxybutyl(meth)acrylate, 4-hydroxybutyl(meth)acrylate and 6-hydroxyhexyl(meth)acrylate. The reaction of the diisocyanate compound with the hydroxyl group-containing (meth)acrylic acid ester is preferably carried out by blending these compounds so that the isocyanate group/hydroxyl group equivalent ratio becomes 1.0/0.5 to 1.0/0.7 and reacting them. The reaction temperature is usually in the range of 0 to 150° C., preferably 40 to 100° C. In the reaction, a urethane reaction catalyst such as dibutyltin dilaurate may be used, and if necessary, a polymerization inhibitor such as p-methoxyquinone or hydroquinone may be allowed to exist. In the reaction, further, an organic solvent, such as methyl ethyl

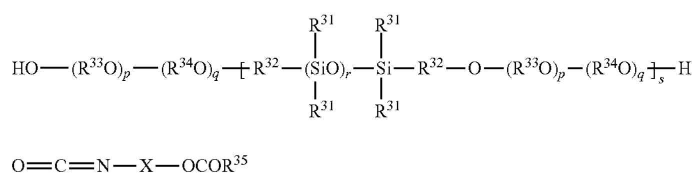

ketone, methyl isobutyl ketone, ethyl acetate, butyl acetate, xylene or cellosolve acetate, can be used.

In the reaction of the compound represented by the formula [IIa] with the compound represented by the formula [IIb], it is preferable that these compounds are blended so that the isocyanate group/hydroxyl group equivalent ratio becomes 0.01/1.0 to 0.5/1.0 and then reacted, though the ratio depends upon the molecular weight and the number of hydroxyl groups of the former compound. It is particularly preferable that the compound represented by the formula [IIa] is blended with the compound represented by the formula [IIb] so that the amounts of them becomes the same moles as each other and then reacted.

On the other hand, in the reaction of the compound represented by the formula [IIIa] with the compound represented by the formula [IIIb], it is preferable that these compounds are blended so that the isocyanate group/hydroxyl group equivalent ratio becomes 0.4/1.0 to 0.6/1.0 and then reacted. It is particularly preferable that the compound represented by the formula [IIIa] is blended with the compound represented by the formula [IIIb] so that the amounts of them becomes the same moles as each other and then reacted.

The above reactions can be carried out at a temperature similar to that in the reaction of the diisocyanate compound with the hydroxyl group-containing (meth)acrylic acid ester. Further, a urethane reaction catalyst similar to that in said reaction may be used, and a polymerization inhibitor similar to that in said reaction may be allowed to exist, and an organic solvent similar to that in said reaction may be used.

If the amount of the compound represented by the formula [IIb] or the formula [IIIb] is too small, polyether modified silicone containing no polymerizable group is formed, and because of the presence of the polyether modified silicone which does not contribute to the reaction, coating film strength tends to be lowered, or the organopolysiloxane-thio block vinyl copolymer tends to become opaque or tends to undergo separation. Contrary to this, if the amount of the compound represented by the formula [IIb] or the formula [IIIb] is too large, gelation is liable to occur in the preparation of organopolysiloxane-thio block vinyl copolymer.

The weight-average molecular weight (Mw) of the polymerizable group-containing polyether modified silicone (a22) or the weight-average molecular weight (Mw) of the polyether modified silicone (a221) and/or (a222) used for preparing the polyether modified silicone (a22), as measured by GPC, is preferably in the range of 300 to 100,000.

The HLB of the polymerizable group-containing polyether modified silicone (a22) is usually in the range of 0 to 18 (not more than 18), preferably 0 to 10. When the constitutional unit (a22) derived from the polymerizable group-containing polyether modified silicone is contained in the constitutional unit (a2), flexibility of the coating film is improved by the polyether modified silicone oil introduced, and therefore, cracks and the like can be prevented, and long-lasting antifouling performance can be enhanced.

[B] Organopolysiloxane-Thio Block

The organopolysiloxane-thio block [B] is represented by the following formula [I].

[I]

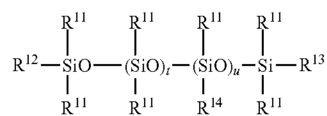

In the formula [I], plural $R^{11}$ are each independently a monovalent hydrocarbon group of 1 to 10 carbon atoms. Examples of the monovalent hydrocarbon groups of 1 to 10 carbon atoms include alkyl groups of 1 to 10 carbon atoms, preferably 1 to 8 carbon atoms, particularly preferably 1 to 3 carbon atoms, such as methyl group, ethyl group, propyl group and isobutyl group, phenyl group, 2-phenylethyl group and fluoroalkyl group. Preferable are the above alkyl groups, and particularly preferable is methyl group.

$R^{12}R^{13}$ and $R^{14}$ are each independently $R^{11}$ or a divalent thio organic group of 1 to 20 carbon atoms. However, at least one of $R^{12}$, and $R^{14}$ is a divalent thio organic group of 1 to 20 carbon atoms.

The divalent thio organic group is represented by the formula —S—X— (wherein X is a divalent organic group of 1 to 20 carbon atoms), and examples of —X— include the following organic groups:

divalent aliphatic hydrocarbon groups which may be branched, such as methylene group (—$CH_2$—), ethylene group (—$(CH_2)_2$—) propylene group (—$CH_2Ch_2CH_2$—, —$CHCH_3CH_2$—, —$CH_2CHCH_3$—), dimethylmethylene group (—$C(CH_3)_2$—), butylene group (—$CH_2CH(CH_3)CH_2$—), dimethylethylene group (—$CH_2C(CH_3)_2$—) and octamethylene group (—$(CH_2)_8$—); and divalent aromatic hydrocarbon groups, such as phenylene group (—$C_6H_4$—) and phenyleneethylene group (—$C_6H_4$—$(CH_2)_2$—).

Of these divalent thio organic groups, thio hydrocarbon groups having a chain divalent hydrocarbon group (X) of 1 to 5 carbon atoms, such as thiotrimethylene group, are preferable.

In the formula [I], t and u are each an integer indicating the total number of the respective repeating units, and t is usually in the range of 0 to 1,500, and u is usually in the range of 1 to 100. These repeating units may be arranged at random or may be arranged so as to form blocks.

Such an organopolysiloxane-thio block [B] is derived from mercapto modified polyorganosiloxane represented by the following formula [Ia].

[Ia]

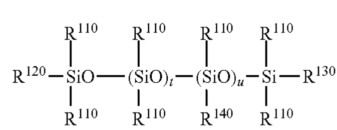

In the formula [Ia], $R^{110}$ has the same meaning as that of $R^{11}$ in the formula [I], and $R^{120}$, $R^{130}$ and $R^{140}$ have the same meanings as those of $R^{12}$, $R^{13}$ and $R^{14}$, respectively, except that the "divalent thio organic group" (—S—X—) is replaced with a "monovalent thio organic group" (HS—X—).

The weight-average molecular weight (Mw) of the mercapto modified polyorganosiloxane [Ia] used for deriving the organopolysiloxane-thio block [B], as measured by GPC, is usually in the range of 300 to 100,000, preferably 500 to 50,000.

As the organopolysiloxane-thio block [B], there are 4 types of one-end type represented by the following formula [I-1], both-end type represented by the following formula [I-2], side-chain type represented by the following formula [I-3], and side-chain both-end type represented by the following formula [I-4], said types being determined depending upon which group among $R^{12}$, $R^{13}$ and $R^{14}$ in the formula [I] the divalent thio organic group of 1 to 20 carbon atoms is.

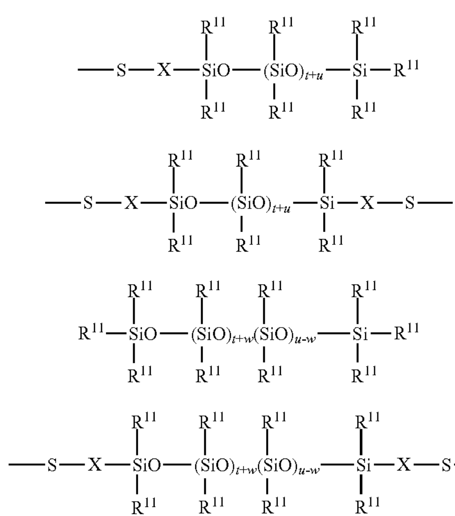

In the formulas [I-1], [1-2], [1-3] and [1-4], $R^{11}$, $R^{12}$, $R^{13}$, $R^{14}$ and X have the same meanings as meanings of those in the formula [I]. In the formulas [1-3] and [1-4], w is an integer satisfying the condition of $0 \le w \le u$.

It is presumed that:

when the organopolysiloxane-thio block [B] is that of one-end type represented by the formula [I-1], this block [B] undergoes addition to (undergoes end capping at) one end or both ends of the carboxylic acid-containing vinyl copolymer block [A], and the organopolysiloxane-thio block vinyl copolymer [C] becomes a block copolymer having a structure of [A]-[B] or [B]-[A]-[B];

when the organopolysiloxane-thio block [B] is that of both-end type represented by the formula [I-2], the carboxylic acid-containing vinyl copolymer block [A] undergoes addition to both ends of this block [B], and the organopolysiloxane-thio block vinyl copolymer [C] becomes a block copolymer having a structure of [A]-[B]-[A];

when the organopolysiloxane-thio block [B] is that of side-chain type represented by the formula [I-3], the carboxylic acid-containing vinyl copolymer block [A] undergoes addition to the side chain of this block [B], and the organopolysiloxane-thio block vinyl copolymer [C] becomes a graft copolymer having a comb-like structure; and when the organopolysiloxane-thio block [B] is that of side-chain both-end type represented by the formula [I-4], the carboxylic acid-containing vinyl copolymer block [A] undergoes addition to both ends and the side chain of this block [B], and the organopolysiloxane-thio block vinyl copolymer [C] becomes a copolymer having a star-like structure.

However, a block structure other than the above structures can exist because of the complicated cessation reaction of radicals.

Examples of the mercapto modified polyorganosiloxanes to derive the organopolysiloxane-thio blocks [B] represented by the above respective formulas include the following products and merchandise:

mercapto modified polyorganosiloxane [1-1] (one-end type): "F3-076-05" and "F3-076-06" available from Dow Corning Toray Co., Ltd., mercapto modified polyorganosiloxane [1-2] (both-end type): "X-22-167B" available from Shin-Etsu Chemical Co., Ltd., and mercapto modified polyorganosiloxane [1-3] (side-chain type): "KF-2001", "KF-2004" and "KP-358" available from Shin-Etsu Chemical Co., Ltd.

<Preparation Process>

The metal-crosslinked organopolysiloxane-thio block vinyl copolymer [D] can be prepared by first preparing the organopolysiloxane-thio block vinyl copolymer [C] having the carboxylic acid-containing vinyl copolymer block [A] and the organopolysiloxane-thio block [B] by radical polymerization and then subjecting the organopolysiloxane-thio block vinyl copolymer [C] and a compound of the divalent metal [M] to metal esterification reaction.

Preparation of Copolymer [C]

The organopolysiloxane-thio block vinyl copolymer [C] can be typically prepared by subjecting:

the polymerizable unsaturated carboxylic acid (a1) (e.g., methacrylic acid, acrylic acid), the polymerizable unsaturated carboxylic acid ester (a21) (e.g., methyl(meth)acrylate, butyl(meth)acrylate, 2-ethylhexyl(meth)acrylate, hydroxyethyl(meth)acrylate, trade name "FM-7711") that is other polymerizable unsaturated monomer (a2) copolymerizable with the polymerizable unsaturated carboxylic acid (a1), and if necessary, the polymerizable group-containing polyether modified silicone (a22), which will constitute the carboxylic acid-containing vinyl copolymer block [A], and the mercapto modified polyorganosiloxane represented by the formula [Ia] (e.g., trade name "KP-358", trade name "KF-2001", available from Shin-Etsu Chemical Co., Ltd. mercapto modified silicone), which will constitute the organopolysiloxane-thio block vinyl copolymer [B], to thermal polymerization or photopolymerization under the usual reaction conditions, and if necessary, in the presence of a radical generation source such as a radical polymerization initiator. The blending ratio of the monomers, the amount of the polymerization initiator, the heating conditions, the reaction time, etc. can be controlled so that the organopolysiloxane-thio block vinyl copolymer [C] may have the aforesaid acid value, glass transition temperature (Tg), weight-average molecular weight (Mw), and the like.

Preparation of Metal-Crosslinked Copolymer [D]

The metal-crosslinked organopolysiloxane-thio block vinyl copolymer [D] can be typically prepared by mixing the organopolysiloxane-thio block vinyl copolymer [C] prepared as above, a compound of the divalent metal [M] for crosslinking the copolymer [C], and if necessary, water with one another to subject them to metal esterification reaction.

As the metal compound, for example, an oxide, a hydroxide, a chloride or an organic carboxylate of the divalent metal [M], such as zinc oxide (zinc white), zinc hydroxide, zinc chloride or zinc acetate, can be used.

The mixing ratio of the organopolysiloxane-thio block vinyl copolymer [C], the metal compound and water, the reaction conditions (temperature, time and the like), etc. can be properly controlled according to the metal-crosslinked organopolysiloxane-thio block vinyl copolymer [D] to be prepared. In usual, the metal-crosslinked organopolysiloxane-thio block vinyl copolymer [D] can be prepared by mixing the copolymer [C], the metal compound, and if necessary, water with one another in a copolymer [C]/metal compound/water mixing ratio of 1-3 acid equivalent/1 mol/0-5 mol and then stirring them, or by homogeneously mixing them in the same mixing ratio and then allowing them to stand still, to thereby react them at a temperature ranging from 20 to 120° C. for 1 to 50 hours.

<Uses>

The metal-crosslinked organopolysiloxane-thio block vinyl copolymer [D] of the present invention is particularly preferably used as a resin component (vehicle component) of antifouling coating materials. In addition, it can be used also for paper sticking preventive coating materials, staining preventive coating materials, ice accretion/snow accretion preventive coating materials, mold release materials, etc., and there is no specific limitation on its uses.

Copolymer Composition, (Antifouling) Coating Composition

By using the metal-crosslinked organopolysiloxane-thio block vinyl copolymer [D] of the present invention as a resin component (vehicle component), an antifouling coating composition and other compositions can be prepared.

When the metal-crosslinked organopolysiloxane-thio block vinyl copolymer [D] is added to an antifouling coating material or other coating materials, it becomes possible to enhance performance of the antifouling coating material or other coating compositions by using a water-repellent substance and/or a hydrophilic substance in combination. That is to say, a metal-crosslinked organopolysiloxane-thio block vinyl copolymer composition containing the metal-crosslinked organopolysiloxane-thio block vinyl copolymer [D] and the water-repellent substance and/or the hydrophilic substance is formed.

(Water-Repellent Component)

Examples of the water-repellent components include paraffins, such as petrolatum, paraffin wax and liquid paraffin; silicone oils, such as dimethyl silicone oil, methyl phenyl silicone oil, alkyl modified silicone oil, fluorine-containing silicone oil (fluorosilicone oil) and functional end group-containing silicone oil; fluorine oils, such as fluoropolyether oil; long-chain fatty acids, such as caprylic acid, capric acid, lauric acid, palmitic acid, stearic acid and oleic acid, and their esters; and natural oils and fats, such as beef tallow, lard, codfish fat, coconut oil and palm oil. Of these, dimethyl silicone oil, methyl phenyl silicone oil, fluorine-containing silicone oil and paraffins are preferable.

When the water-repellent component is used, the amount thereof is not specifically restricted, but from the viewpoints of film forming property, drying property and adhesion property of a coating film formed from the (antifouling) coating material, the amount of the water-repellent component is usually in the range of 0 to 100 parts by weight, preferably 1 to 50 parts by weight, based on 100 parts by weight of the metal-crosslinked organopolysiloxane-thio block vinyl copolymer [D] (solids content).

(Hydrophilic Component)

The hydrophilic component is, for example, polyether modified silicone oil (other than the polymerizable group-containing polyether modified silicone (a22)). HLB of the polyether modified silicone oil is usually in the range of 0 to 12 (not more than 12), preferably 0 to 7. The type of the polyether modified silicone oil may be any of pendant type, both-end modified type and block type. Examples of the pendant type polyether modified silicone oils include"ST-114PA" (available from Dow Corning Toray Co., Ltd.), "FZ-2130" (available from Dow Corning Toray Co., Ltd.), "FZ-2191" (available from Dow Corning Toray Co., Ltd.) and "KF-6016" (available from Shin-Etsu Chemical Co., Ltd.). Examples of the both-end type polyether modified silicone oils include "X-22-4272" (available from Shin-Etsu Chemical Co., Ltd.) and "SLJ1623/3" (available from Wacker Asahikasei Silicone Co., Ltd.). Examples of the block type polyether modified silicone oils include "FZ-2203" (available from Dow Corning Toray Co., Ltd.) and "FZ-2207" (available from Dow Corning Toray Co., Ltd.).

When the hydrophilic component is used, the amount thereof is not specifically restricted, but from the viewpoints of film forming property, drying property, adhesion property and long-lasting antifouling performance of a coating film formed from the (antifouling) coating material, the amount of the hydrophilic component is usually in the range of 1 to 100 parts by weight, preferably 5 to 50 parts by weight, based on 100 parts by weight of the metal-crosslinked organopolysiloxane-thio block vinyl copolymer [D] (solids content).

The antifouling coating material containing the metal-crosslinked organopolysiloxane-thio block vinyl copolymer [D] as a resin component (vehicle component) sufficiently exhibits antifouling performance even if an antifouling agent is not added, differently from the conventional antifouling coating materials. In order to further enhance antifouling performance, however, an antifouling agent may be added, when needed.

(Antifouling Agent)

Examples of the antifouling agents include metallic copper, copper suboxide, copper rhodanide, basic copper sulfate, basic copper acetate, basic copper carbonate, copper oxyquinolate, copper naphthenate, copper rosinate, copper pyrithione, zinc pyrithione, tetramethylthiuram disulfite, 2,4,5,6-tetrachloroisophthalonitrile, N,N-dimethyldichlorophenylurea, 2-methylthio-4-tert-butylamino-6-cyclopropylamino-s-triazine, 4,5-dichloro-2-n-octyl-4-isothiazolin-3-one, 2,4,6-trichlorophenylmaleimide, pyridine-triphenylborane, and amine-triphenylborane.

Moreover, various components added to publicly known antifouling coating compositions, such as solvent, elution assisting agent, plasticizer, thixotropic agent (anti-sag agent, anti-settling agent), pigment (color pigment, extender pigment), coating film-forming component (vehicle) other than the metal-crosslinked organopolysiloxane-thio block vinyl copolymer [D], leveling agent and ultraviolet light absorber, can be used, when needed. Unless otherwise noted, the components given below may be used singly or in combination of two or more kinds. The amounts of the components added can be properly controlled in consideration of the amounts thereof added to the publicly known antifouling coating compositions.

(Solvent)

As the solvent, a solvent having proper volatility at ordinary temperature and capable of dissolving monomers used for preparing the metal-crosslinked organopolysiloxane-thio block vinyl copolymer [D], the synthesized organopolysiloxane-thio block vinyl copolymer [C] and the synthesized metal-crosslinked organopolysiloxane-thio block vinyl copolymer [D] can be used without any restriction. Examples of such solvents include aromatic hydrocarbons, such as toluene and xylene; aliphatic hydrocarbons, such as hexane and heptane; ethers, such as diethyl ether, di-n-propyl ether, dibutyl ether, tetrahydrofuran and dioxane; esters, such as ethyl acetate and butyl acetate; ketones, such as methyl ethyl ketone and methyl isobutyl ketone; chlorinated hydrocarbons, such as dichloromethane and chloroform; alcohols, such as methanol, isopropanol and butanol; and glycol derivative-based solvents, such as ethylene glycol monomethyl ether and propylene glycol monomethyl ether.

(Elution Assisting Agent)

As the elution assisting agent, a compound having such a surfactant-like function as to assist the water-repellent agent that is added when needed with surface migration or as to efficiently slowly release the antifouling agent that is added when needed can be used, and examples of such compounds include rosin and naphthenic acid.

(Plasticizer)

As the plasticizer, a compound which imparts flexibility to a coating film and has a function to improve crack resistance and adhesion property can be used, and examples of such compounds include chlorinated paraffin, orthophosphoric acid ester and phthalic acid ester.

(Thixotropic Agent)

As the thixotropic agent (anti-sagagent, anti-settlingagent), a compound having a function to enhance thick coating property or anti-sag property during the coating operation or having a function to prevent sedimentation of a pigment that is added to a coating composition when needed can be used. Examples of such compounds include organic clay-based waxes (amine salt, stearate salt, lecithin salt, alkylsulfonic acid salt of Al, Ca or Zn, etc.), organic waxes (polyethylene wax, polyethylene oxide wax, polyamide wax, amide wax, hydrogenated castor oil wax, etc.), mixtures of the organic clay-based waxes and the organic waxes, and synthetic finely divided silica. Of these, polyamide wax, polyethylene oxide wax and synthetic finely divided silica are preferable.

(Pigment)

As the pigment (other than a substance used as an antifouling agent), any of hitherto publicly known various color or extender pigments of organic or inorganic type can be used. Examples of the organic pigments include carbon block, phthalocyanine blue and Prussian blue. Examples of the inorganic pigments include titanium oxide (titanium white), red iron oxide, silica, calcium carbonate, talc, barium sulfate, zinc oxide (zinc white), white lead, minium and zinc dust.

(Other Resins)

Examples of the resins (coating film-forming components) other than the metal-crosslinked organopolysiloxane-thio block vinyl copolymer [D] include acrylic resin, acrylic silicone resin, polyester resin, fluororesin, polybutene resin, silicone rubber, urethane resin (rubber), polyamide resin, vinyl chloride-based copolymer resin, chlorinated rubber (resin), chlorinated olefin resin, styrene/butadiene copolymer resin, ethylene/vinyl acetate copolymer resin, vinyl chloride resin, coumarone resin, trialkylsilyl acrylate (co)polymer (silyl-based resin), petroleum resin, ketone resin, formaldehyde resin and polyvinyl alkyl ether resin.

(Leveling Agent)

As the leveling agent (anti-foaming agent), a substance which further enhances coating property of a resin composition to improve finished appearance of a coating film and can be uniformly applied to form a thin film, such as a fluorine-based leveling agent, a silicone-based leveling agent, or an ether-based or ester-based leveling agent, can be mentioned.

(Ultraviolet Light Absorber)

Examples of the ultraviolet light absorbers (light stabilizers) include substances having an ultraviolet light absorption function and/or a light stabilization function, which have been hitherto used by adding them to coating compositions, e.g., organic ultraviolet light absorbers, such as oxalic anilide-based, salicylic acid-based, benzophenone-based, triazine-based, benzotriazole-based, and cyanoacrylate-based ultraviolet light absorbers; inorganic ultraviolet light absorbers, such as titanium oxide, zinc oxide and cerium oxide; and light stabilizers, such as organic nickel compound and hindered amine-based light stabilizer.

<Preparation Process>

The (antifouling) coating composition of the present invention can be prepared by a publicly known process similar to that for general (antifouling) coating compositions, using the metal-crosslinked organopolysiloxane-thio block vinyl copolymer solution of the present invention prepared. After the metal-crosslinked organopolysiloxane-thio block vinyl copolymer solution of the present invention is prepared, the solution may be used as it is as an antifouling coating composition. In the case where components, such as water-repellent component/hydrophilic component, silane coupling agent, antifouling agent, elution assisting agent, plasticizer, dehydrating agent (stabilizer), thixotropic agent (anti-sag/anti-settling agent), pigment, other coating film-forming components and solvent, are blended when needed, they are added in a given ratio at once or in an arbitrary order, then stirred and mixed to give a homogeneous solution or dispersion.

<Uses>

The antifouling coating composition of the present invention can form excellent antifouling coating films which stably exhibit high antifouling performance against aquatic organisms, such as sea lettuce, barnacle, green layer, serpula, oyster, mussel and Bryozoa, for a long period of time even in not only constant-submerged portions but also dry-wet alternate portions and portions near the water surface. For example, if various substrates or surfaces of under coatings of ships, fishery materials (e.g., rope, fishing net, float, buoy), underwater structures, such as water supply/drain ports of thermal electric power/atomic power plants, bay coast roads, undersea tunnels, harbor equipment, canals/channels, sludge diffusion preventive films of ocean civil engineering works, etc., are coated with the antifouling coating composition, ships, underwater structures, fishery materials, etc. coated with excellent antifouling coating films capable of preventing adhesion of aquatic organisms for a long period of time can be obtained. Even when the material of the substrate is steel, FRP, wood, aluminum alloy or the like, the antifouling coating composition favorably adheres to its surface, and when a surface of an undercoating film or an existing antifouling coating film is top-coated with the antifouling coating composition, the composition is excellent also in adhesion property (recoatability).

EXAMPLES

Raw Materials

Raw materials used in the examples and the comparative examples (see Tables 2 to 5) are as shown in the following table.

TABLE 1

| Raw materials | |
|---|---|
| Symbols in Tables 2 to 5 | Raw materials |
| PGM | propylene glycol monomethyl ether |
| MMA | methyl methacrylate |
| BMA | n-butyl methacrylate |
| BA | n-butyl acrylate |
| 2EHA | 2-ethylhexyl acrylate |
| CHA | cyclohexyl acrylate |
| CHMA | cyclohexyl methacrylate |
| N-230G | methoxypolyethylene glycol methacrylate available from Shin-Nakamura Chemical Co., Ltd. (trade name "NK Ester M-230G", number of —$C_2H_4$—O— units: 23 (mean value), solids content: 100%) |
| 2HEMA | 2-hydroxyetyl methacrylate |
| FM-7711 | both-end methacryloxy group silicone available from Chisso Corporation (trade name "Silaplane FM-7711", number-average molecular weight Mn: 1,000) |
| FM-7721 | both-end methacryloxy group silicone available from Chisso Corporation (trade name "Silaplane FM-7721", number-average molecular weight Mn: 5,000) |

TABLE 1-continued

| Raw materials | |
|---|---|
| Symbols in Tables 2 to 5 | Raw materials |
| S-1 | reaction product of FZ-2191/Karenz MOI (100/2.7 (weight ratio)) (equivalent ratio: 1.0/0.2) |
| S-2 | reaction product of X-22-4272/Karenz MOI (100/6.9 (weight ratio)) (equivalent ratio: 1.0/0.5) |
| Karenz MOI | 2-methacryloyloxyethyl isocyanate available from Showa Denko K.K. (trade name "Karenz MOI") |
| MAA | methacrylic acid |
| AA | acrylic acid |
| Undecylenic acid | unsaturated fatty acid (C11) available from Itoh Oil Chemicals Co., Ltd., $CH_2{=}CH(CH_2)_8COOH$ (trade name "Undecylenic acid") |
| Kayaester O | t-butyl peroxy-2-ethylhexanoate available from Kayaku Akzo Corporation (trade name "Kayaester O", polymerization initiator) |
| Kayabutyl B | t-butyl peroxybenzoate available from Kayaku Akzo Corporation (trade name "Kayabutyl B", polymerization initiator) |
| KP-358 | mercapto modified silicone available from Shin-Etsu Chemical Co., Ltd. (tradename "KP-358", weight-average molecular weight Mw: 4,400, solids content: 100%, SH group: side chain) |
| KF-2001 | mercapto modified silicone available from Shin-Etsu Chemical Co., Ltd. (trade name "KF-2001", weight-average molecular weight Mw: 9,200, solids content: 100%, SH group: side chain) |
| ABN-E | 2,2'-azobis(2-methylbutyronitrile) available from Japan Hydrazine Company Inc. (trade name "ABN-E", polymerization initiator) |
| ABN-R | 2,2'-azobisisobutyronitrile available from Japan Hydrazine Company Inc. (trade name "ABN-R", polymerization initiator) |
| Nofmer MSD | α-methylstyrene dimer available from Nippon Oil & Fats Co., Ltd. (trade name "Nofmer MSD", polymerization modifier) |
| Fuji First Red 2305W | organic red pigment available from Fuji Pigment Co., Ltd. |
| R-5N | titanium oxide available from Sakai Chemical Industry Co., Ltd. |
| KF-96-1000 | dimethyl silicone oil available from Shin-Etsu Chemical Co., Ltd., viscosity: 1000 cSt |
| KF-50-3000 | methyl phenyl silicone oil available from Shin-Etsu Chemical Co., Ltd., viscosity: 3000 cSt |
| KF-54 | methyl phenyl silicone oil available from Shin-Etsu Chemical Co., Ltd., viscosity: 400 cSt |
| KF-6016 | side-chain type polyether modified silicone oil available from Shin-Etsu Chemical Co., Ltd., viscosity: 170 cSt, HLB: 3.5 |
| ST-114PA | side-chain type polyether modified silicone oil available from Dow Corning Toray Co., Ltd., viscosity: 75 cSt, HLB: 4.3 |
| FZ-2191 | side-chain type polyether modified silicone oil available from Dow Corning Toray Co., Ltd., viscosity: 900 cSt, HLB: 5 |
| X-22-4272 | both-end type polyether modified silicone oil available from Shin-Etsu Chemical Co., Ltd., viscosity: 300 cSt, HLB: 7 |
| FZ-2203 | block type polyether modified silicone oil available from Dow Corning Toray Co., Ltd., viscosity: 4500 cSt, HLB: 1 |
| KF-6028 | siloxane branched type polyether modified silicone oil available from Shin-Etsu Chemical Co., Ltd., HLB: 4 |
| Dis. 6900-10X | trade name "Disperon 6900-10X" available from Kusumoto Chemicals, Ltd., fatty acid amide wax, 10% xylene paste |

<Measuring Conditions>

Measuring conditions of GPC and IR are as follows.

[GPC Measuring Conditions]

Apparatus: HLC-8120GPC manufactured by Tosoh Corporation

Column: Super H2000+H4000 manufactured by Tosoh Corporation, 6 mm I.D., 15 cm

Eluting solution: THF

Flow rate: 0.5 ml/min

Detector: RI

Temperature of column constant temperature bath: 40° C.

[IR Measuring Conditions]

Apparatus: Spectrum One FT-IR manufactured by Perkin Elmer, Inc.

Measuring method: KBr cell, coating method

Synthesis of Polymerizable Group-Containing Polyether Modified Silicone (a22)

Synthesis Example 1

Modified Silicone S-1

In a reaction container equipped with a stirring device, a thermometer and a reflux condenser, 1,150 parts by weight of FZ-2191 (trade name "FZ-2191", available from Dow Corning Toray Co., Ltd., side-chain OH group-containing EO modified silicone, solids content: 100%, OH equivalents: 1150) were placed, and the temperature was raised up to 60° C. Subsequently, a mixed solution of 31 parts by weight of 2-methacryloyloxyethyl isocyanate (trade name "Karenz MOI", available from Showa Denko K.K.), 0.59 part by weight of p-methoxyphenol and 93 parts by weight of butyl acetate was dropwise added over a period of 30 minutes, and then 38 parts by weight of butyl acetate were further introduced, followed by performing reaction at 60° C. for 1 hour. The reaction product was subjected to IR analysis, and as a result, the isocyanate group absorption peak completely disappeared.

Thereafter, 93 parts by weight of butyl acetate were added to obtain a modified silicone S-1 solution. This modified silicone S-1 solution had a transparent appearance, and had NV (heating residue after drying for 3 hours in a hot air dryer at 108° C.) of 88.1% by weight and a viscosity of 296 mPa·s/25° C. The weight-average molecular weight (Mw) of the modified silicone S-1, as measured by GPC, was 10,540.

Synthesis Example 2

Modified Silicone S-2

In a reaction container equipped with a stirring device, a thermometer and a reflux condenser, 1, 122 parts by weight of X-22-4272 (trade name "X-22-4272", available fromShin-Etsu Chemical Co., Ltd., both-end OH group-containing EO modified silicone, solids content: 100%, OH equivalents: 1122), 77.5 parts by weight of 2-methacryloyloxyethyl isocyanate (trade name "Karenz MOI", available from Showa Denko K.K.) and 0.6 part by weight of p-methoxyphenol were placed, and the temperature was raised up to 95° C., followed by performing reaction for 16 hours.

The reaction product was subjected to IR analysis, and as a result, the isocyanate group absorption peak completely disappeared, and a modified silicone S-2 solution was obtained. This modified silicone S-2 solution had a transparent appearance, and had NV (heating residue after drying for 3 hours in a hot air dryer at 108° C.) of 90.2% and a viscosity of 248 mPa·s/25° C. The weight-average molecular weight (Mw) of the modified silicone S-2, as measured by GPC, was 4,890.

Syntheses of Organopolysiloxane-Thio Block Vinyl Copolymer [C] and Metal-Crosslinked Copolymer [D]

Example 1

Organopolysiloxane-Thio Block Vinyl Copolymer B-1

In a reaction container equipped with a stirring device, a thermometer, a nitrogen gas feed pipe, a dropping device and a reflux condenser, 32.1 parts by weight of butyl acetate and 29.2 parts by weight of propylene glycol monomethyl ether (PGM) were placed, and the temperature was raised up to 120° C. in a nitrogen gas atmosphere. Subsequently, dropping of a mixture A consisting of 57.5 parts by weight of methyl methacrylate (MMA), 5 parts by weight of n-butyl methacrylate (BMA), 5 parts by weight of 2-ethylhexyl acrylate (2EHA), 2.5 parts by weight of methoxypolyethylene glycol methacrylate (trade name "NK Ester M-230G", available from Shin-Nakamura Chemical Co., Ltd., number of —$C_2H_4$—O— units: 23 (mean value), solids content: 100% by weight), 2.5 parts by weight of methacrylic acid (MAA), 2.5 parts by weight of acrylic acid (AA), 12 parts by weight of t-butyl peroxy-2-ethylhexanoate (trade name "Kayaester 0", available from Kayaku Akzo Corporation, peroxide) as a polymerization initiator and 3.5 parts by weight of propylene glycol monomethyl ether (PGM) as shown in Table 2, and dropping of a mixture B consisting of 25 parts by weight of KP-358 (trade name "KP-358", mercapto modified silicone available from Shin-Etsu Chemical Co., Ltd., weight-average molecular weight (Mw): 4,400, solids content: 100% by weight, position of SH group: side-chain type) and 12.5 parts by weight of butyl acetate as shown in Table 2, into the reaction container were started at the same time with maintaining the internal temperature at 120° C. The mixture A was dropped over a period of 4 hours, and the mixture B was dropped over a period of 2 hours. After the dropping of the mixture A was completed, an additional mixed catalyst of 1 part by weight of t-butyl peroxy-2-ethylhexanoate and 4.5 parts by weight of butyl acetate was dropwise added over a period of 30 minutes. Thereafter, the resulting mixture was stirred for 2 hours with retaining heat to obtain an organopolysiloxane-thio block vinyl copolymer B-1 solution. This copolymer B-1 solution had a transparent appearance, and a film of the copolymer had a transparent appearance. The copolymer B-1 solution had NV (heating residue after drying for 3 hours in a hot air dryer at 108° C.) of 52.4% by weight, a viscosity of 111 mPa·s/25° C. and an acid value of 19.6 KOHmg/g. The weight-average molecular weight (Mw) of the copolymer B-1, as measured by GPC, was 6,510.

(Metal-Crosslinked Copolymer A-1)

In an apparatus similar to the above one, 824.4 parts by weight of the copolymer B-1 solution and 5.86 parts by weight of zinc white were placed, and they were stirred for 30 minutes at 30° C. in a nitrogen gas atmosphere, followed by raising the temperature up to 90° C. After 3.89 parts by weight of water were added at 90° C., the mixture was stirred for 2 hours with retaining heat. Thereafter, 5.86 parts by weight of zinc white were further added, and the mixture was stirred for 2 hours with retaining heat to obtain a metal-crosslinked copolymer A-1 solution. This metal-crosslinked copolymer A-1 solution had a transparent appearance, and had NV (heating residue after drying for 3 hours in a hot air dryer at 108° C.) of 52.7% by weight, a viscosity of 4,420 mPa·s/25° C. and a water content of 0.84% by weight. The film transparency of the metal-crosslinked copolymer A-1 was slightly opaque.

Preparation conditions (amounts of raw materials, catalyst, solvent and the like (unit of values in the table: part (s) by weight), reaction temperature, reaction time, etc.) for the metal-crosslinked copolymer A-1 solution and the copolymer B-1 solution, properties of the resulting metal crosslinked copolymer A-1 solution and the resulting copolymer B-1 solution, etc. are set forth in Table 2. Meanings of the symbols (trade names) shown in the table, manufacturers, etc. are as described in Table 1. A chart of an IR spectrum of the resulting metal-crosslinked copolymer A-1 is shown in FIG. 1.

Examples 2 to 4

Figure 2:
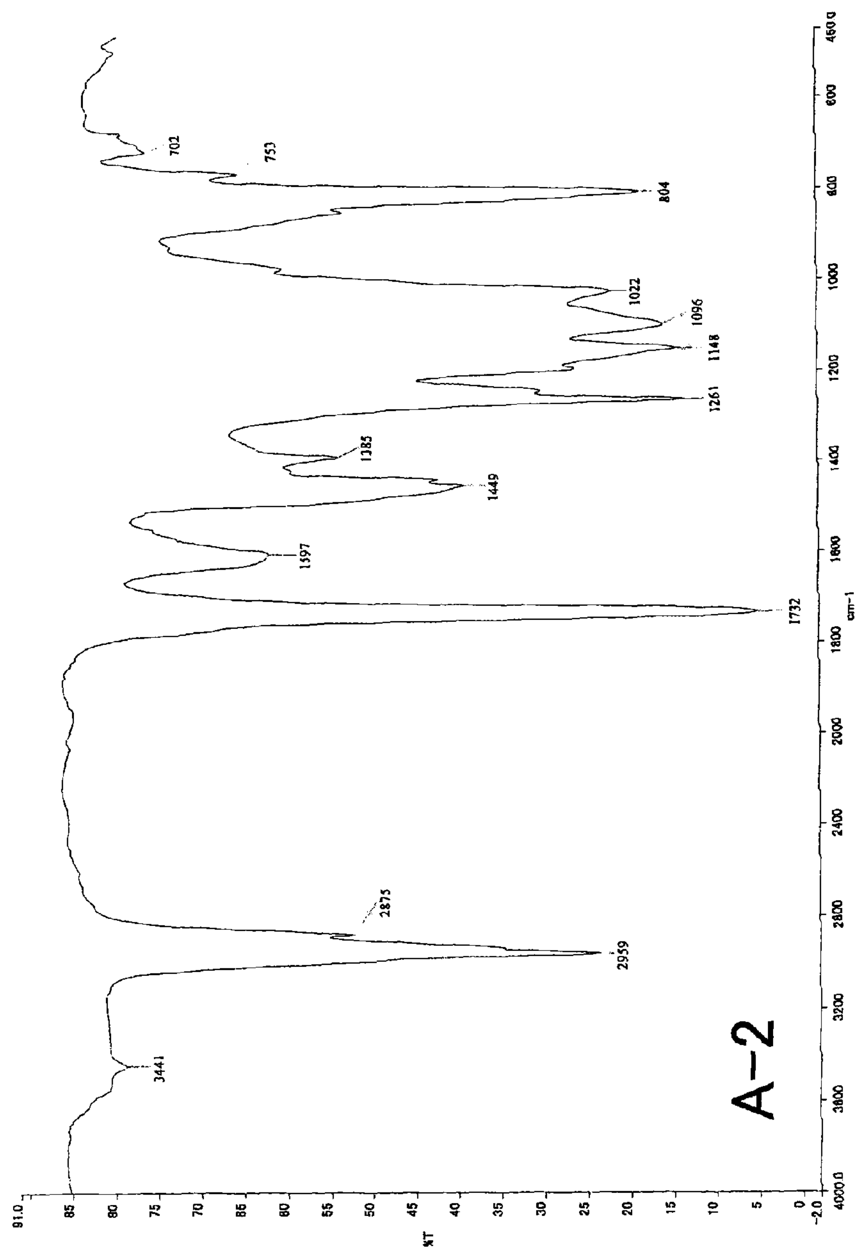
FIG. 2 is a chart of an IR spectrum of a metal-crosslinked copolymer A-2 (Example 2).
Figure 3:
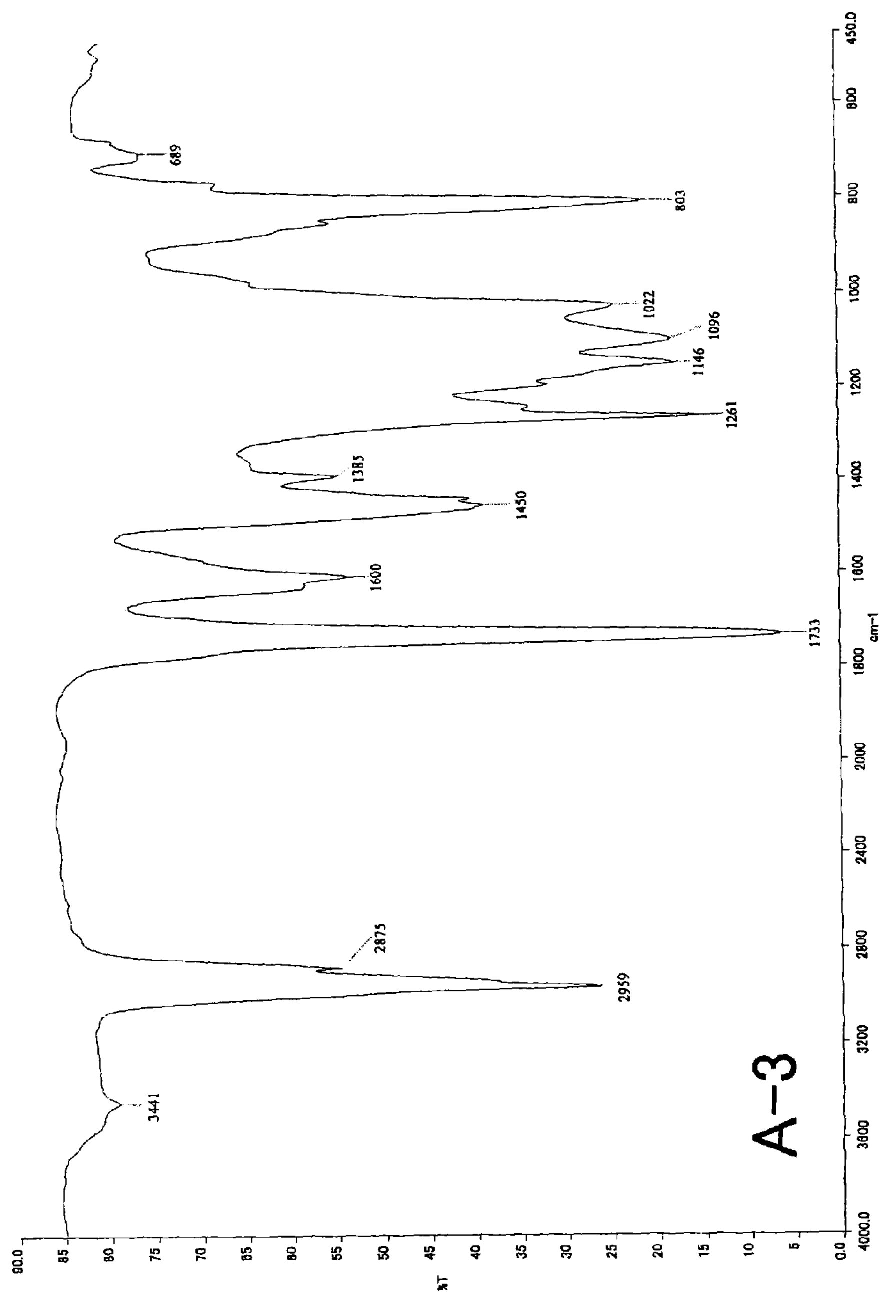
FIG. 3 is a chart of an IR spectrum of a metal-crosslinked copolymer A-3 (Example 3).
Figure 4:
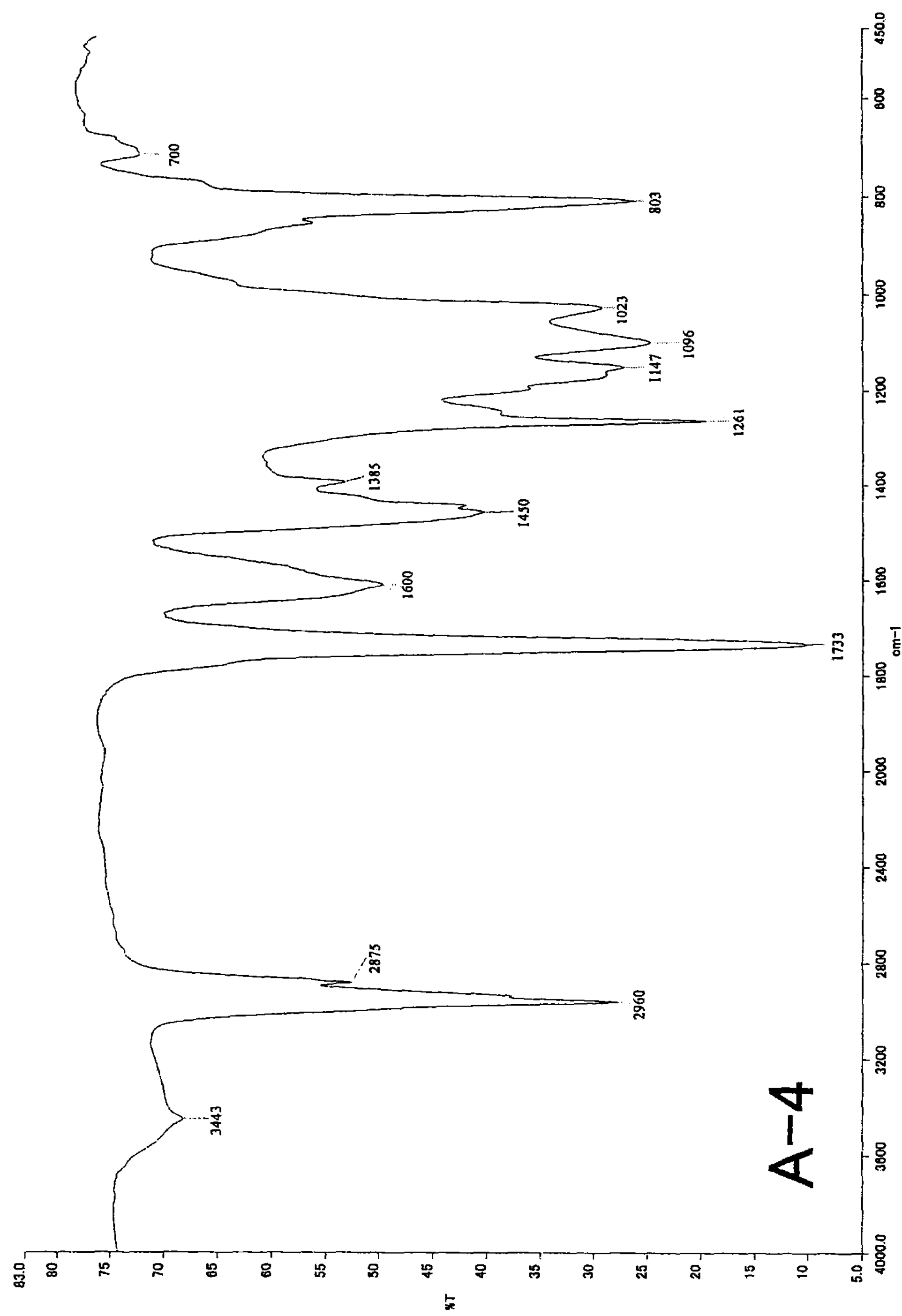
FIG. 4 is a chart of an IR spectrum of a metal-crosslinked copolymer A-4 (Example 4).

Organopolysiloxane-thio block vinyl copolymers B-2 to B-4 solutions were synthesized and then metal-crosslinked copolymers A-2 to A-4 solutions were synthesized in the same manner as in Example 1, except that the amounts of the raw materials, the catalyst, the solvent and the like (unit of values in the table: part (s) by weight), the reaction time, etc. were changed as shown in Table 2. Thereafter, properties of the copolymers were evaluated in the same manner as in Example 1. Preparation conditions (amounts of raw materials, catalyst, solvent and the like (unit of values in the table: part (s) by weight), reaction temperature, reaction time, etc.) for the copolymers B-2 to B-4 solutions and the metal-crosslinked copolymers A-2 to A-4 solutions, properties of the resulting copolymers B-2 to B-4 solutions and the resulting metal-crosslinked copolymers A-2 to A-4 solutions, etc. are set forth in Table 2. Charts of IR spectra of the metal-crosslinked copolymers A-2 to A-4 are shown in FIGS. 2 to 4.

Example 5

Organopolysiloxane-Thio Block Vinyl Copolymer B-5

In a reaction container equipped with a stirring device, a thermometer, a nitrogen gas feed pipe, a dropping device and a reflux condenser, 32.1 parts by weight of butyl acetate and 29.2 parts by weight of propylene glycol monomethyl ether (PGM) were placed, and the temperature was raised up to 120° C. in a nitrogen gas atmosphere. Subsequently, dropping of a mixture A consisting of 15 parts by weight of methyl methacrylate (MMA), 15 parts by weight of n-butyl methacrylate (BMA), 20 parts by weight of n-butyl acrylate (BA), 5 parts by weight of 2-ethylhexyl acrylate (2EHA), 5 parts by weight of cyclohexyl acrylate (CHA), 7.5 parts by weight of methacrylic acid (MAA), 7.5 parts by weight of acrylic acid (AA), 12 parts by weight of t-butyl peroxy-2-ethylhexanoate (trade name "Kayaester 0", available from Kayaku Akzo Corporation, peroxide) as a polymerization initiator and 3.5 parts by weight of propylene glycol monomethyl ether (PGM) as shown in Table 2, and dropping of a mixture B consisting of 25 parts by weight of KP-358 (trade name "KP-358", mercapto modified silicone available from Shin-Etsu Chemical Co., Ltd., weight-average molecular weight (Mw): 4,400, solids content: 100% by weight, position of SH group: side-chain type) and 12.5 parts by weight of butyl acetate as shown in Table 2, into the reaction container were started at the same time with maintaining the internal temperature at 120° C. The mixture A was dropped over a period of 4 hours, and the mixture B was dropped over a period of 2 hours. After the dropping of the mixture A was completed, an additional mixed catalyst of 1 part by weight of t-butyl peroxy-2-ethylhexanoate and 4.5 parts by weight of butyl acetate was dropwise added over a period of 30 minutes. Thereafter, the resulting mixture was stirred for 2 hours with retaining heat to obtain an organopolysiloxane-thio block vinyl copolymer B-5 solution. This copolymer B-5 solution had a transparent appearance, and a film of the copolymer had an opaque appearance. The copolymer B-5 solution had NV (heating residue after drying for 3 hours in a hot air dryer at 108° C.) of 53.6% by weight, a viscosity of 74 mPa·s/25° C. and an acid value of 52.8 KOHmg/g. The weight-average molecular weight (Mw) of the copolymer B-5, as measured by GPC, was 5,860.

(Metal-Crosslinked Copolymer A-5)

In an apparatus similar to the above one, 794.8 parts by weight of the copolymer B-5 solution and 15.22 parts by weight of zinc white were placed, and they were stirred for 30 minutes at 30° C. in a nitrogen gas atmosphere, followed by raising the temperature up to 90° C. After 10.1 parts by weight of water were added at 90° C., the mixture was stirred for 2 hours with retaining heat. Thereafter, 15.22 parts by weight of zinc white were further added, and the mixture was stirred for 13 hours with retaining heat. Thereafter, 38.45 parts by weight of butyl acetate and 25.66 parts by weight of propylene glycol monomethyl ether (PGM) were added to obtain a metal-crosslinked copolymer A-5 solution. This metal-crosslinked copolymer A-5 solution had a transparent appearance, and had NV (heating residue after drying for 3 hours in a hot air dryer at 108° C.) of 49.5% by weight and a viscosity of 3,980 mPa·s/25° C. The film transparency of the metal-crosslinked copolymer A-5 was clear.

Figure 5:
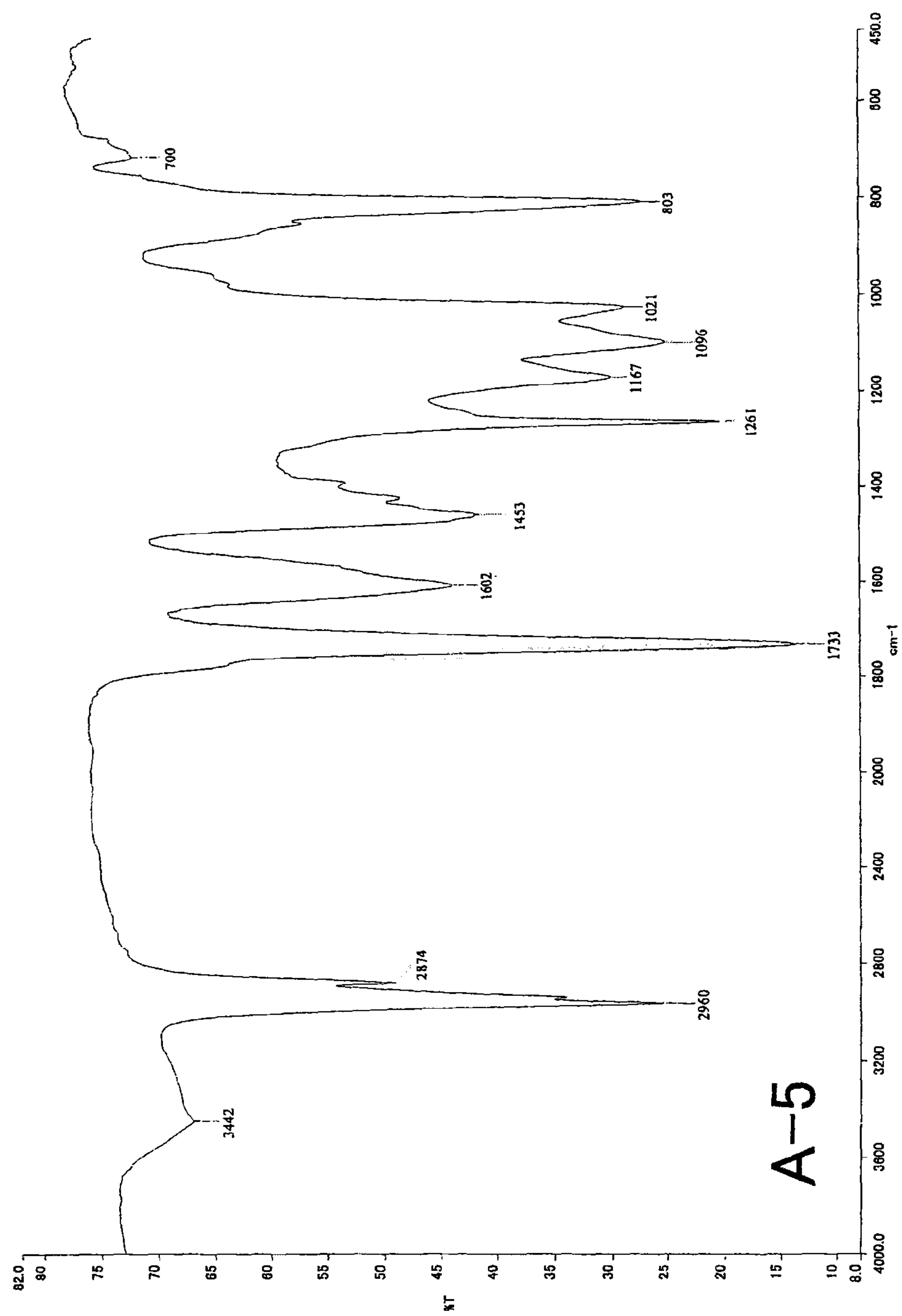
FIG. 5 is a chart of an IR spectrum of a metal-crosslinked copolymer A-5 (Example 5).
Figure 6:
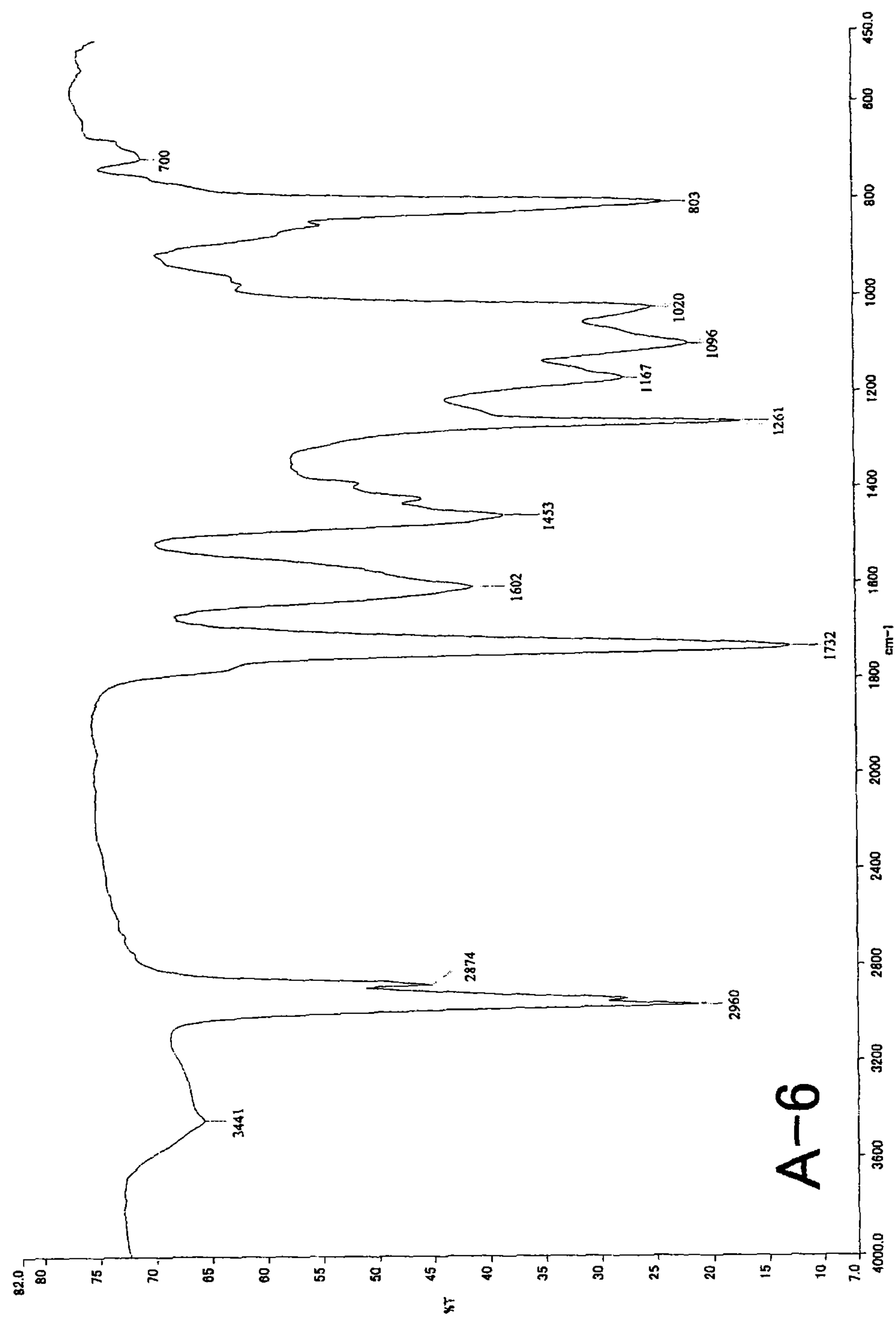
FIG. 6 is a chart of an IR spectrum of a metal-crosslinked copolymer A-6 (Example 6).
Figure 7:
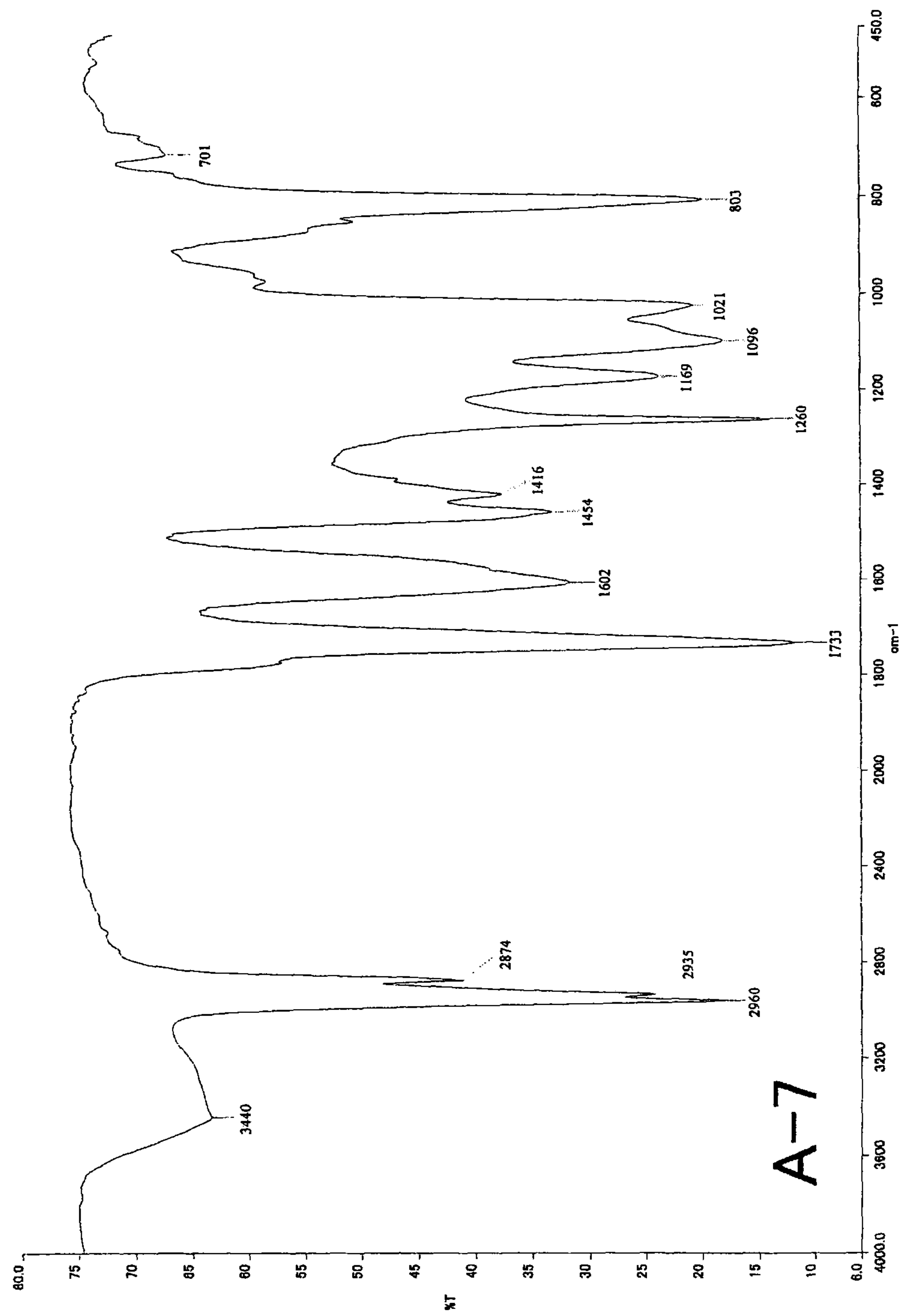
FIG. 7 is a chart of an IR spectrum of a metal-crosslinked copolymer A-7 (Example 7).
Figure 8:
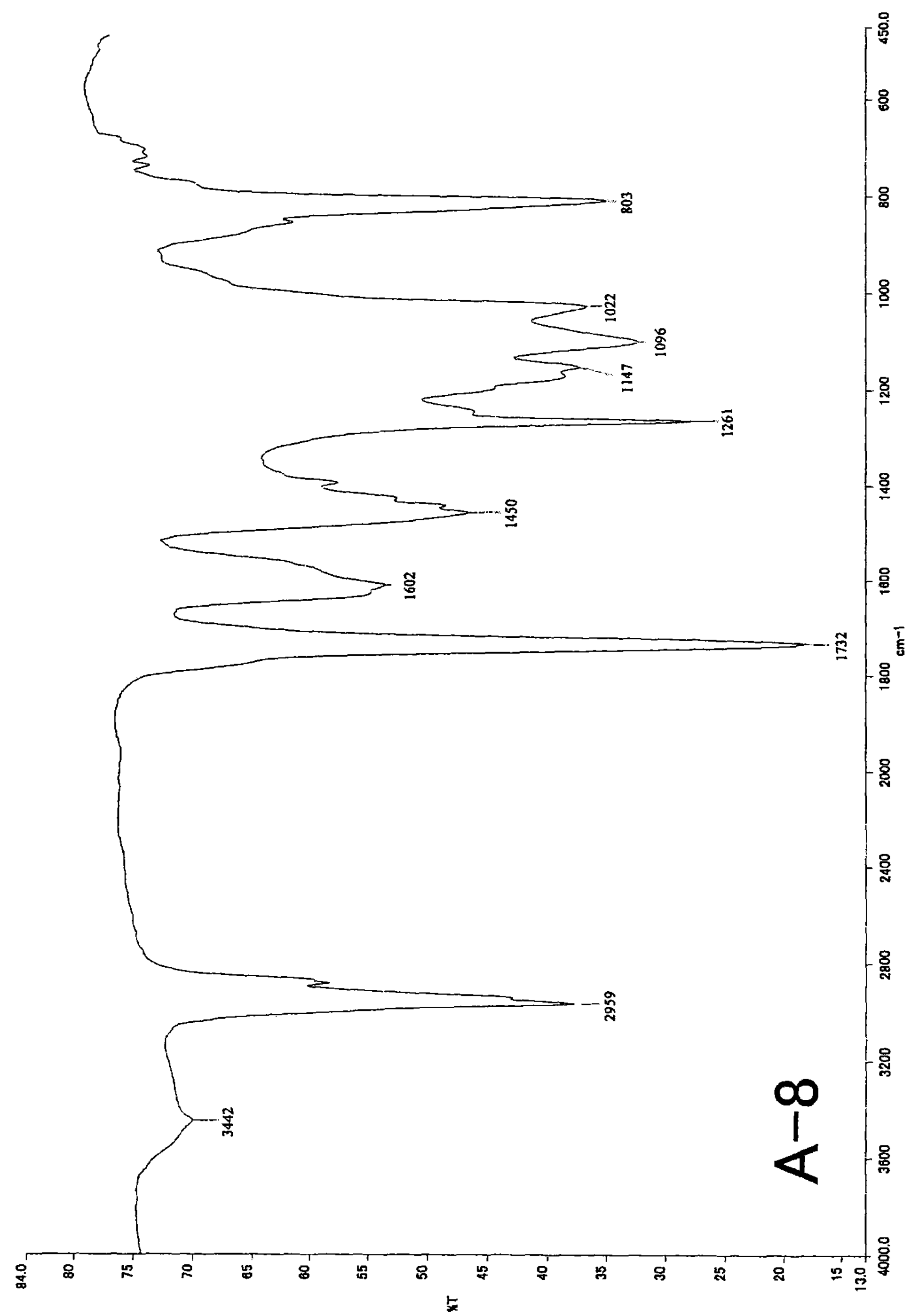
FIG. 8 is a chart of an IR spectrum of a metal-crosslinked copolymer A-8 (Example 8).
Figure 9:
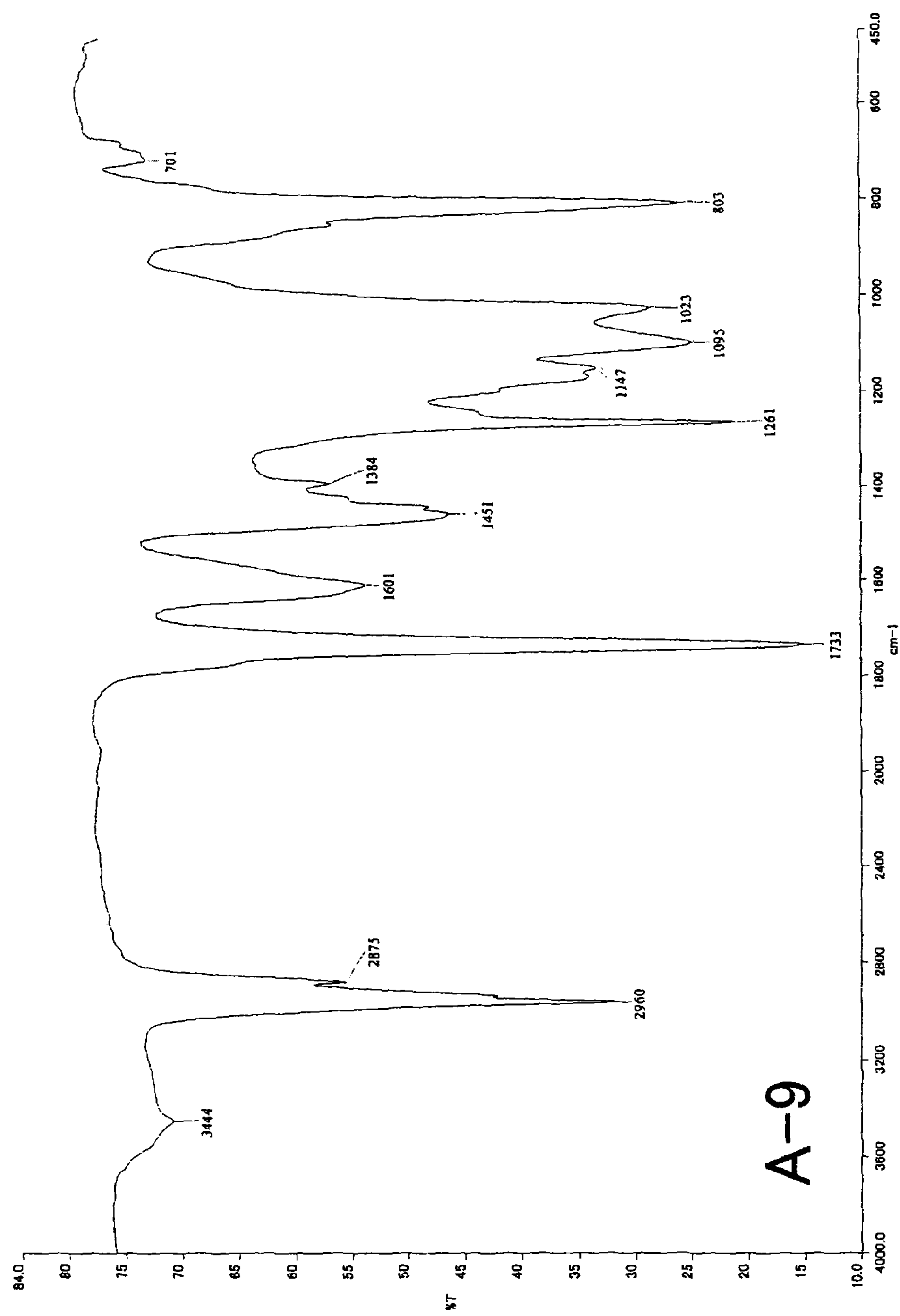
FIG. 9 is a chart of an IR spectrum of a metal-crosslinked copolymer A-9 (Example 9).
Figure 10:
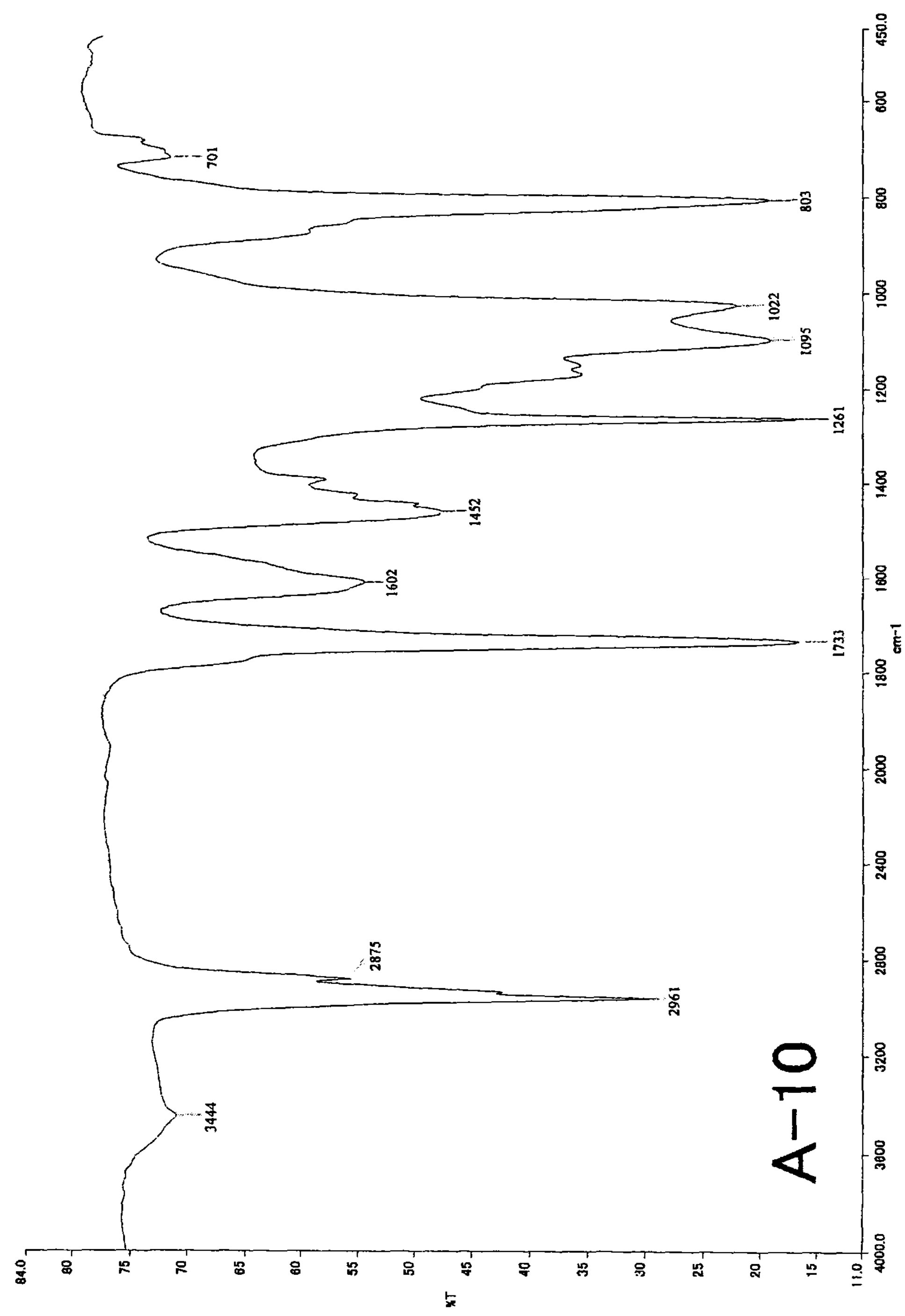
FIG. 10 is a chart of an IR spectrum of a metal-crosslinked copolymer A-10 (Example 10).
Figure 11:
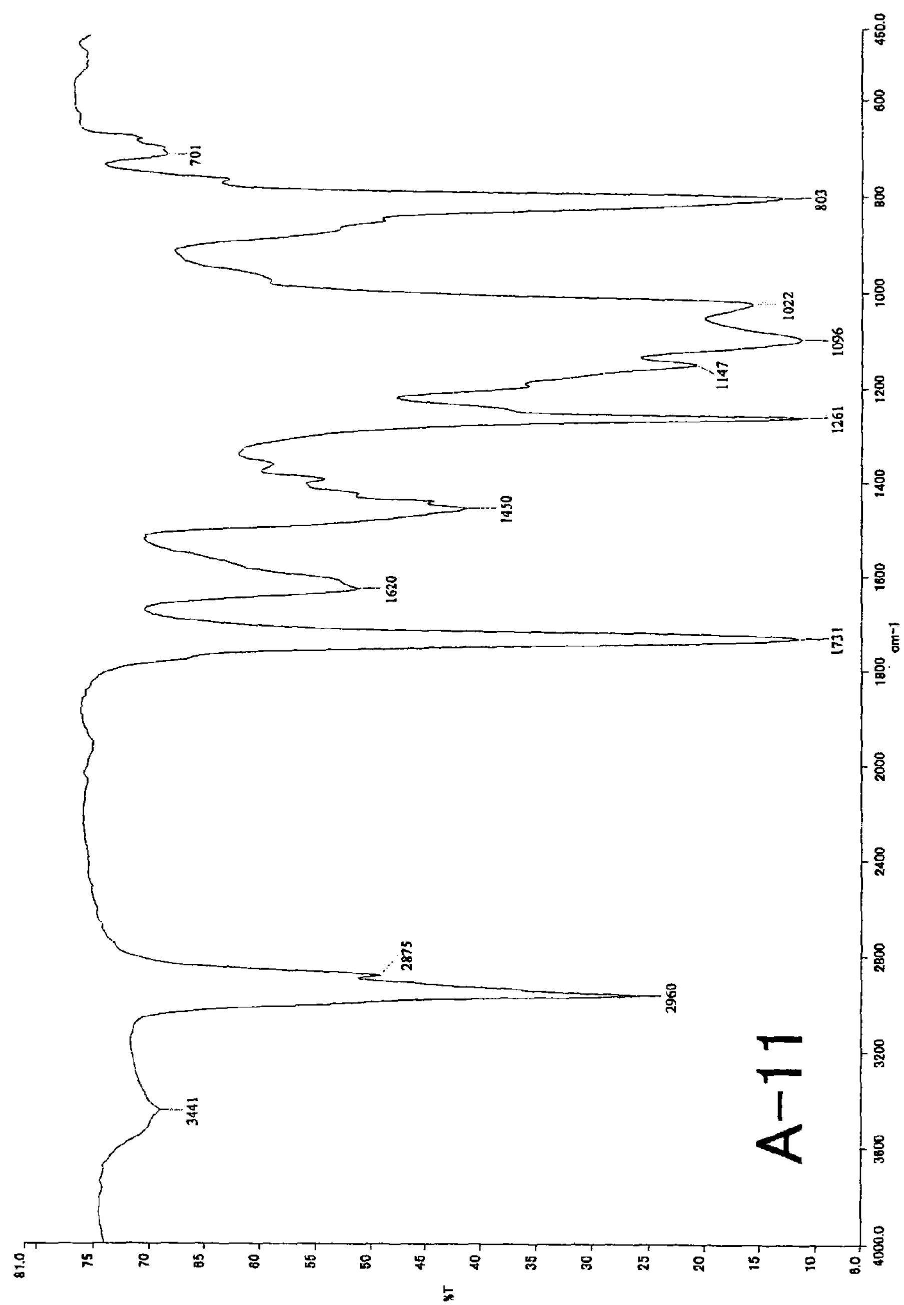
FIG. 11 is a chart of an IR spectrum of a metal-crosslinked copolymer A-11 (Example 11).
Figure 12:
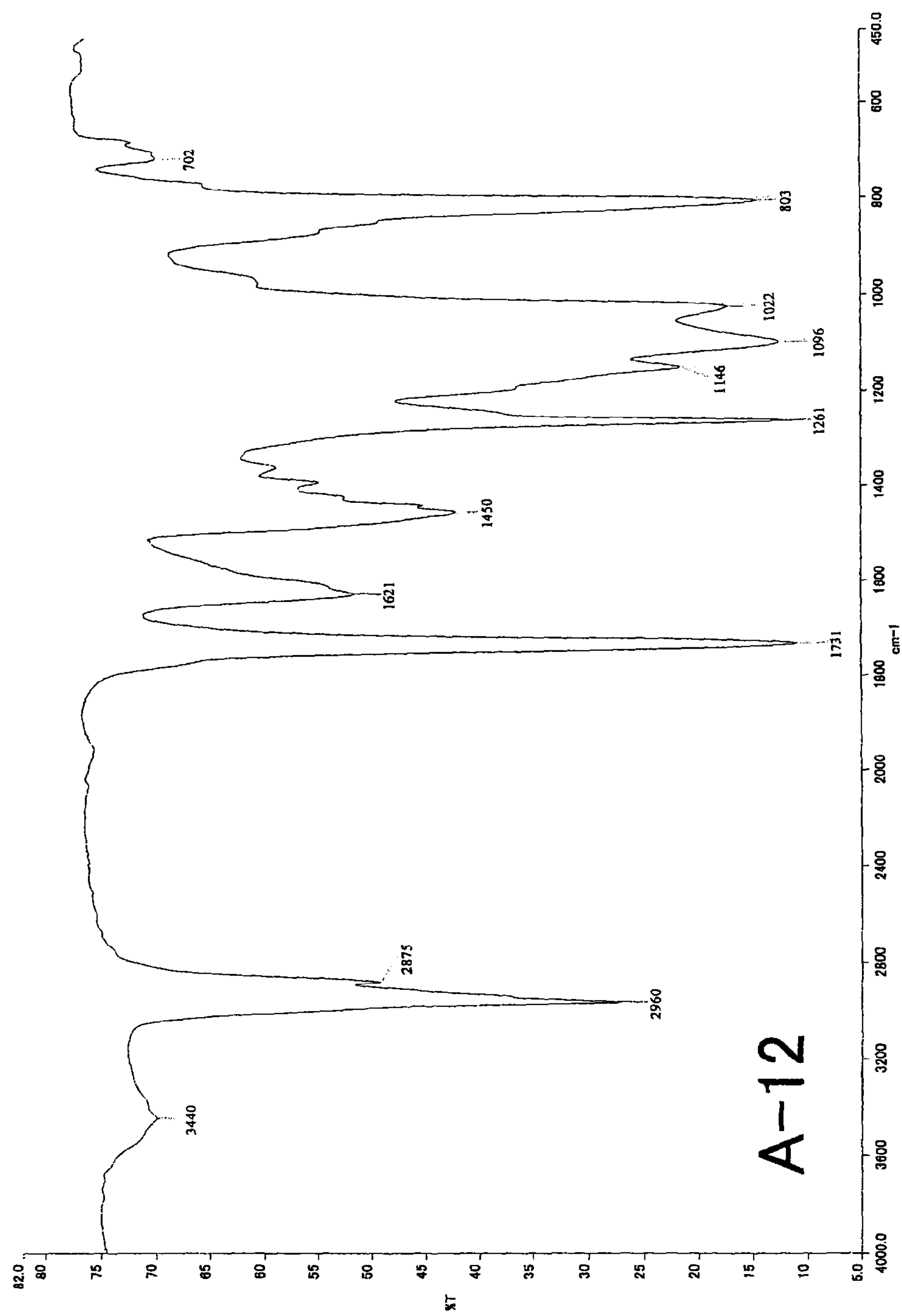
FIG. 12 is a chart of an IR spectrum of a metal-crosslinked copolymer A-12 (Example 12).
Figure 13:
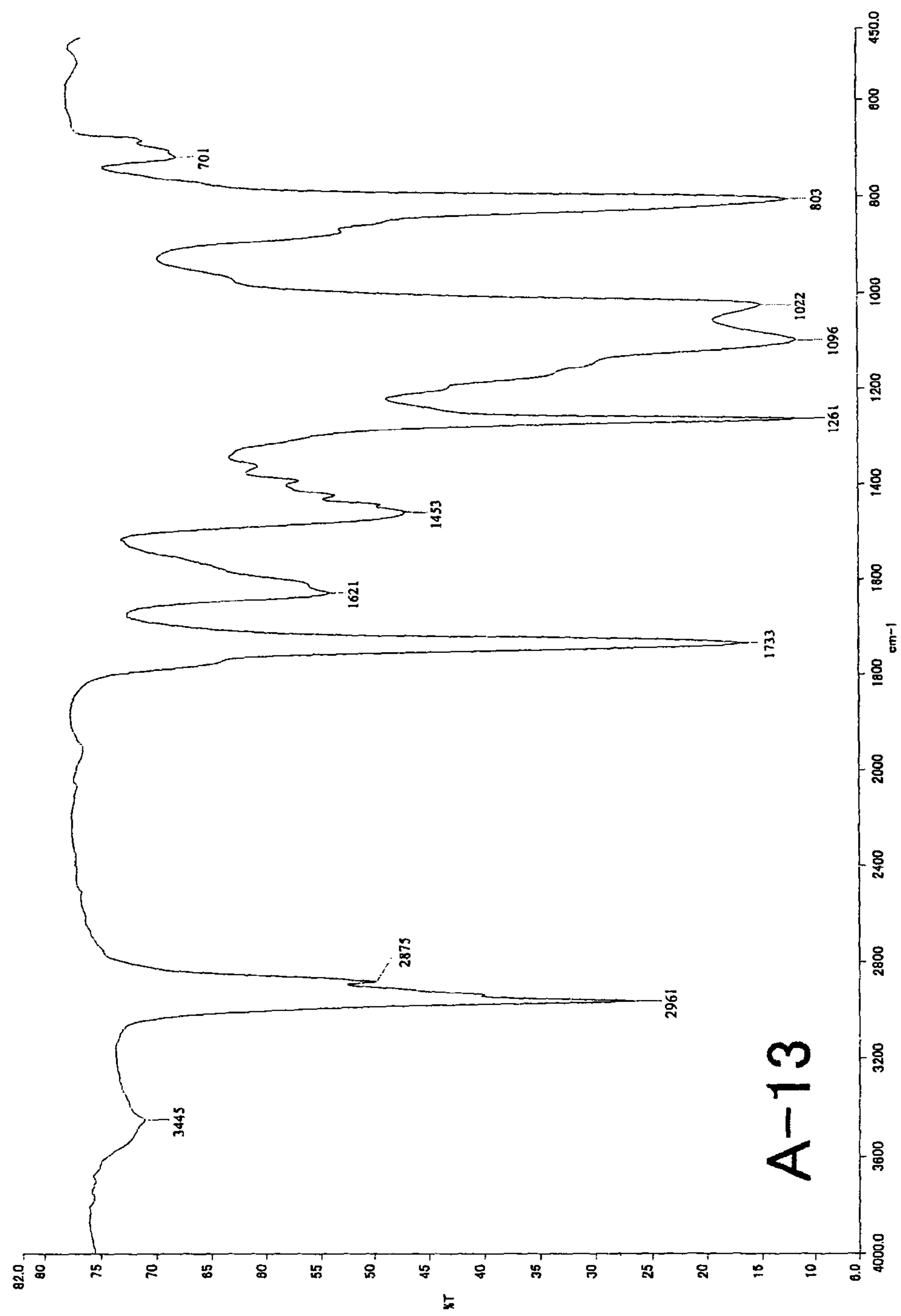
FIG. 13 is a chart of an IR spectrum of a metal-crosslinked copolymer A-13 (Example 13).
Figure 14:
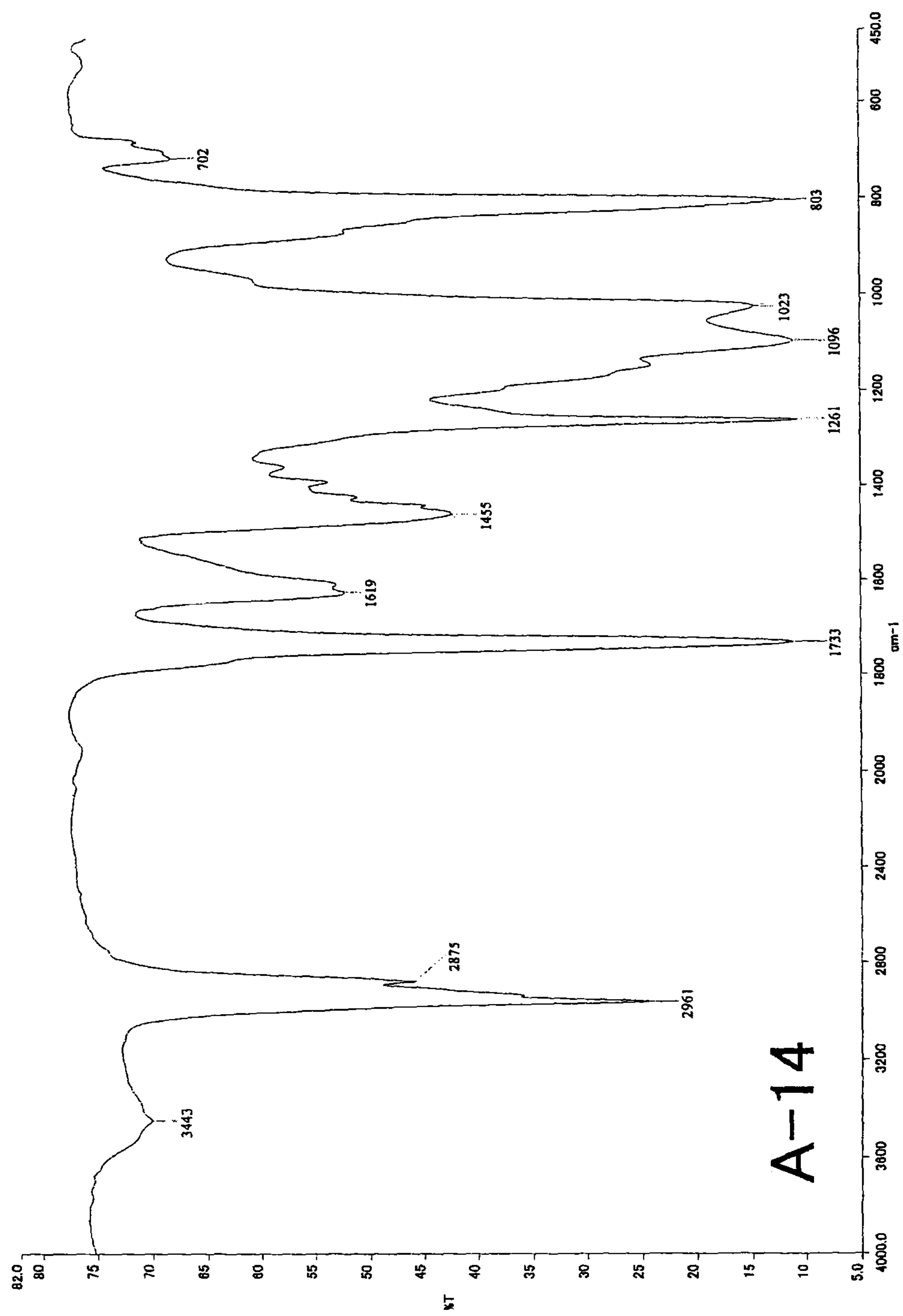
FIG. 14 is a chart of an IR spectrum of a metal-crosslinked copolymer A-14 (Example 14).
Figure 15:
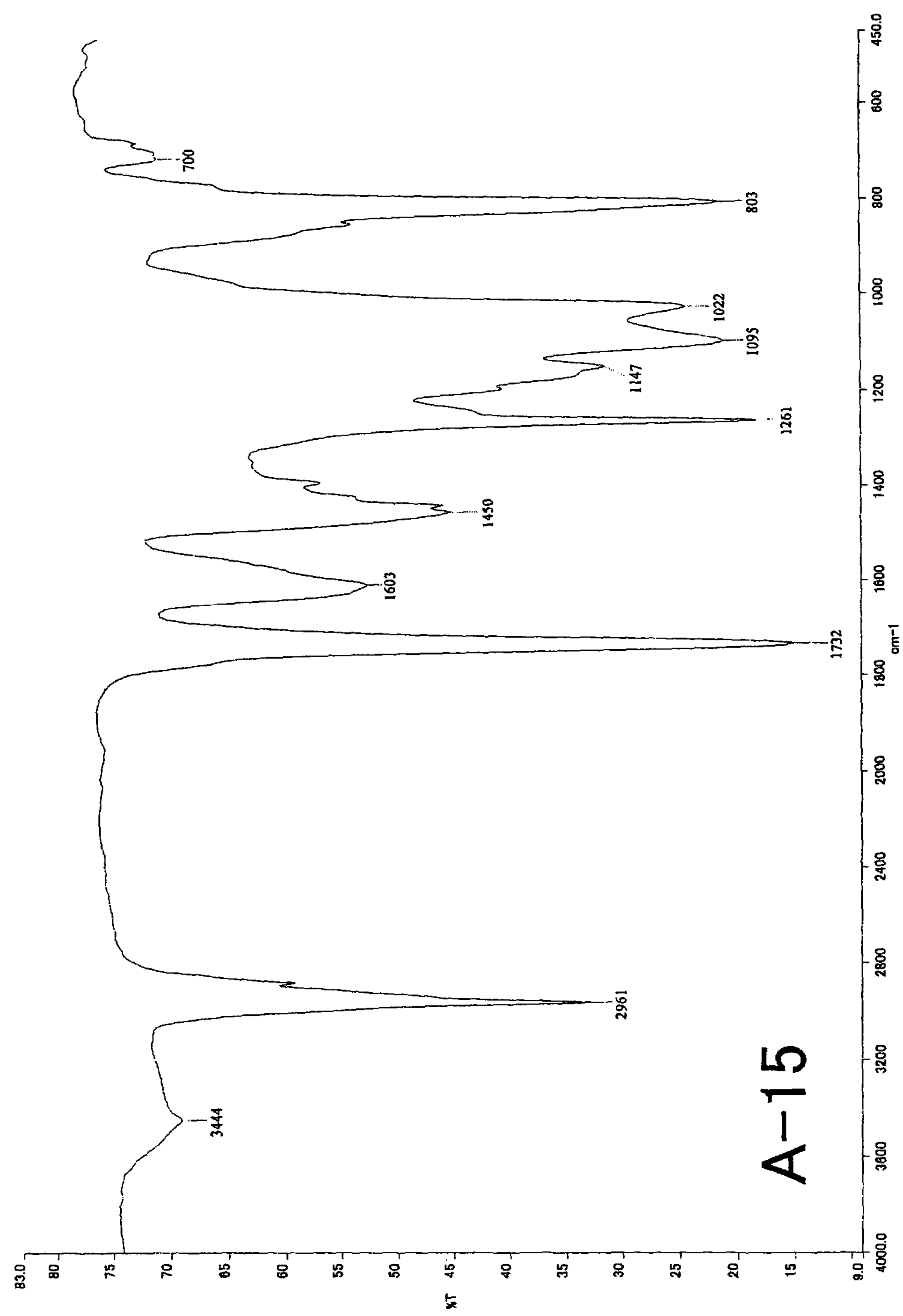
FIG. 15 is a chart of an IR spectrum of a metal-crosslinked copolymer A-15 (Example 15).

Preparation conditions (amounts of raw materials, catalyst, solvent and the like (unit of values in the table: part (s) by weight), reaction temperature, reaction time, etc.) for the metal-crosslinked copolymer A-5 solution and the copolymer B-5 solution, properties of the resulting metal-crosslinked copolymer A-5 solution and the resulting copolymer B-5 solution, etc. are set forth in Table 2. A chart of an IR spectrum of the resulting metal-crosslinked copolymer A-5 is shown in FIG. 5.

Examples 6 to 15

Organopolysiloxane-thio block vinyl copolymers B-6 to B-15 solutions were synthesized and then metal-crosslinked copolymers A-6 to A-15 solutions were synthesized in the same manner as in Example 5, except that the amounts of the raw materials, the catalyst, the solvent and the like (unit of values in the table: part (s) by weight), the reaction time, etc. were changed as shown in Table 2. Thereafter, properties of the copolymers were evaluated in the same manner as in Example 5. Preparation conditions (amounts of raw materials, catalyst, solvent and the like (unit of values in the table: part (s) by weight), reaction temperature, reaction time, etc.) for the copolymers B-6 to B-15 solutions and the metal-crosslinked copolymers A-6 to A-15 solutions, properties of the resulting copolymers B-6 to B-15 solutions and the resulting metal-crosslinked copolymers A-6 to A-15 solutions, etc. are set forth in Table 2. Charts of IR spectra of the metal-crosslinked copolymers A-6 to A-15 are shown in FIGS. 6 to 15.

Example 16

Organopolysiloxane-Thio Block Vinyl Copolymer B-16

In a reaction container equipped with a stirring device, a thermometer, a nitrogen gas feed pipe, a dropping device and a reflux condenser, 40.3 parts by weight of xylene and 21 parts by weight of propylene glycol monomethyl ether (PGM) were placed, and the temperature was raised up to 120° C. in a nitrogen gas atmosphere. Subsequently, dropping of a mixture A consisting of 42.5 parts by weight of methyl methacrylate (MMA), 10 parts by weight of n-butyl acrylate (BA), 12.5 parts by weight of 2-ethylhexyl acrylate (2EHA), 5 parts by weight of methacrylic acid (MAA), 5 parts by weight of acrylic acid (AA), 12 parts by weight of t-butyl peroxy-2-ethylhexanoate (trade name "Kayaester 0", available from Kayaku Akzo Corporation, peroxide) as a polymerization initiator and 3.5 parts by weight of propylene glycol monomethyl ether (PGM) as shown in Table 2, and dropping of a mixture B consisting of 25 parts by weight of KP-358 (trade name "KP-358", mercapto modified silicone available from Shin-Etsu Chemical Co., Ltd., weight-average molecular weight (Mw): 4,400, solids content: 100% by weight, position of SH group: side-chain type) and 12.5 parts by weight of butyl acetate as shown in Table 2, into the reaction container were started at the same time with maintaining the internal temperature at 120° C. The mixture A was dropped over a period of 4 hours, and the mixture B was dropped over a period of 2 hours. After the dropping of the mixture A was completed, an additional mixed catalyst of 1 part by weight of t-butyl peroxy-2-ethylhexanoate and 4.5 parts by weight of butyl acetate was dropwise added over a period of 30 minutes. Thereafter, the resulting mixture was stirred for 2 hours with retaining heat to obtain an organopolysiloxane-thio block vinyl copolymer B-16 solution. This copolymer B-16 solution had a transparent appearance, and a film of the copolymer had a transparent appearance. The copolymer B-16 solution had NV (heating residue after drying for 3 hours in a hot air dryer at 108° C.) of 53.7% by weight, a viscosity of 90 mPa·s/25° C. and an acid value of 36.4 KOHmg/g. The weight-average molecular weight (Mw) of the copolymer B-16, as measured by GPC, was 6,140.

(Metal-Crosslinked Copolymer A-16)

In an apparatus similar to the above one, 644.2 parts by weight of the copolymer B-16 solution, 41.73 parts by weight of copper acetate, 142.03 parts by weight of xylene and 0.36 part by weight of a 20% KF-96-1000 xylene solution (trade name "KF-96-1000", dimethyl silicone oil available from Shin-Etsu Chemical Co., Ltd., viscosity: 1000 cSt) were placed, and they were stirred for 30 minutes at 30° C. in a nitrogen gas atmosphere, followed by raising the temperature up to 90° C. The mixture was stirred for 2 hours at 90° C. with retaining heat, and then with recovering the solvent by heating, the temperature was raised up to 150° C. over a period of 4.5 hours. The amount of the solvent recovered was 327.6 parts by weight. The resulting liquid was cooled, and 397.5 parts by weight of xylene were added to obtain a metal-crosslinked copolymer A-16 solution. This metal-crosslinked copolymer A-16 solution had a transparent appearance, and had NV (heating residue after drying for 3 hours in a hot air dryer at 108° C.) of 40.2% by weight and a viscosity of 19,610 mPa·s/25° C. The film transparency of the metal-crosslinked copolymer A-16 was clear.

Figure 16:
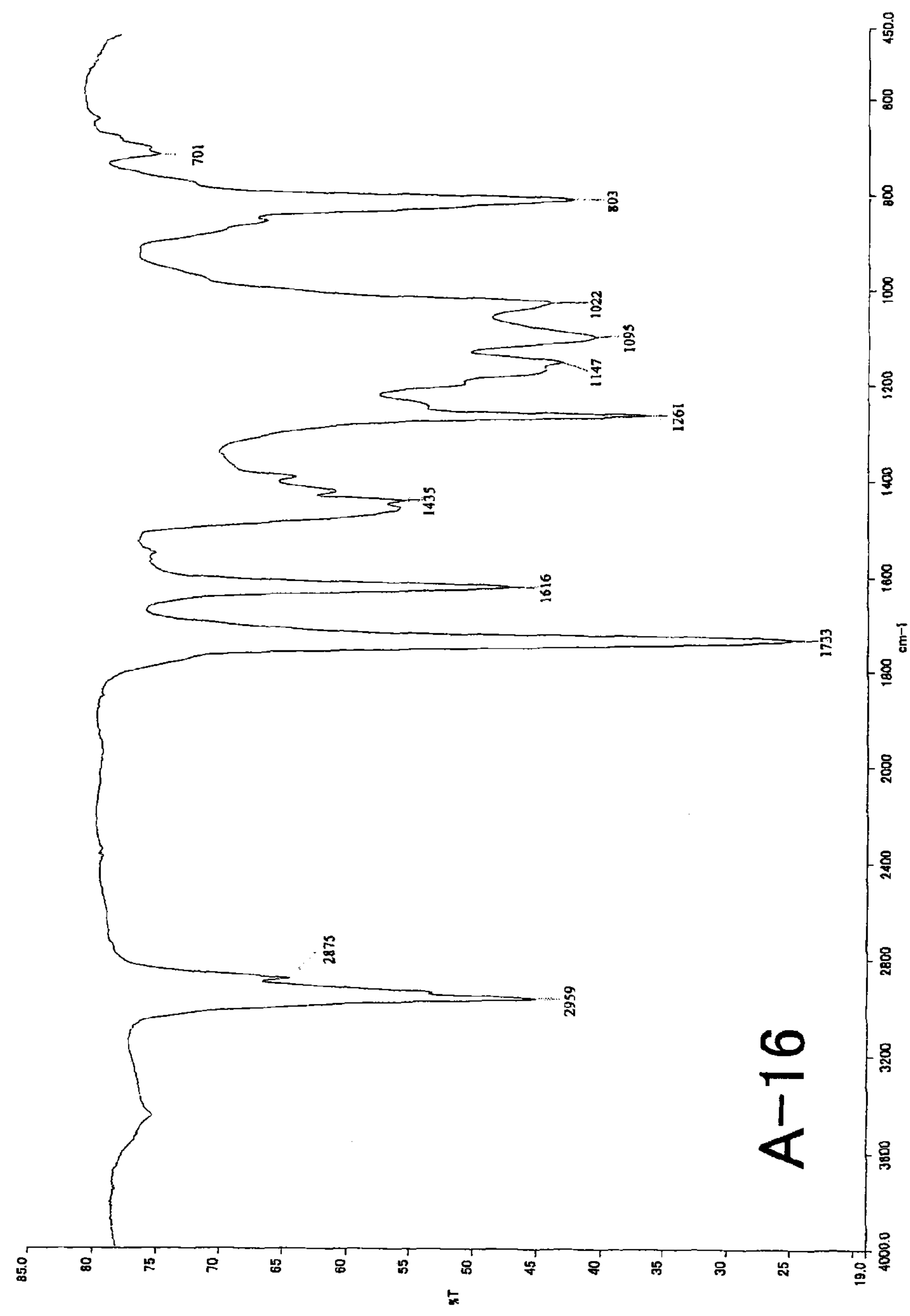
FIG. 16 is a chart of an IR spectrum of a metal-crosslinked copolymer A-16 (Example 16).

Preparation conditions (amounts of raw materials, catalyst, solvent and the like (unit of values in the table: part (s) by weight), reaction temperature, reaction time, etc.) for the metal-crosslinked copolymer A-16 solution and the copolymer B-16 solution, properties of the resulting metal-crosslinked copolymer A-16 solution and the resulting copolymer B-16 solution, etc. are set forth in Table 2. A chart of an IR spectrum of the resulting metal-crosslinked copolymer A-16 is shown in FIG. 16.

TABLE 2

| Copolymers (Examples) (the upper left section) | | Ex. 1 | Ex. 2 | Ex. 3 | Ex. 4 |
|---|---|---|---|---|---|
| Symbols of metal-crosslinked copolymers | | A-1 | A-2 | A-3 | A-4 |
| Blending | B-1 | 824.4 | | | |
| | B-2 | | 825.7 | | |
| | B-3 | | | 813.4 | |
| | B-4 | | | | 824.8 |
| | B-5 | | | | |
| | B-6 | | | | |
| | B-7 | | | | |
| | B-8 | | | | |
| | ZnO | 5.86 | 5.33 | 8.26 | 11.07 |
| | $H_2O$ | 3.89 | 2.36 | 10.96 | 7.34 |
| | ZnO | 5.86 | 5.33 | 8.26 | 11.07 |
| | Butyl acetate | | | | |
| | PGM | | | | |
| Total | | 840.01 | 838.72 | 840.88 | 854.28 |
| Blending ratio | | | | | |
| Organopolysiloxane-thio block copolymer (equivalent) | | 2 | 2 | 2 | 2 |
| $H_2O$ (mol) | | 1.5 | 1 | 3 | 1.5 |
| ZnO (mol) | | 0.5 + 0.5 | 0.5 + 0.5 | 0.5 + 0.5 | 0.5 + 0.5 |
| 90° C. reaction time (H) | | 13 H | 14 H | 13 H | 15 H |
| Solution properties | | | | | |
| NV (%) | | 52.7 | 52.5 | 55.3 | 53.3 |
| Viscosity (mPa · s/25° C.) | | 4,420 | 480 | 1,030 | 9,790 |
| Water content (%) | | 0.84 | not measured | 1.54 | 1.42 |
| Theoretical water content (%) | | (0.77) | (0.56) | (1.74) | (1.44) |
| Film transparency | | slightly opaque | very opaque | clear | clear |

| (the lower left section) | | Ex. 1 | Ex. 2 | Ex. 3 | Ex. 4 |
|---|---|---|---|---|---|
| Symbols of organopolysiloxane-thio block vinyl copolymers | | B-1 | B-2 | B-3 | B-4 |
| Blending | | | | | |
| Reaction container, initial stage | Butyl acetate | 32.1 | 32.1 | 32.1 | 32.1 |
| | PGM | 29.2 | 29.2 | 29.2 | 29.2 |
| Solution A dropped | MMA | 57.5 | 47.5 | 45.5 | 42.5 |
| | BMA | 5 | 10 | 10 | |
| | BA | | | | 10 |
| | 2EHA | 5 | 10 | 10 | 12.5 |
| | CHA | | | | |
| | CHMA | | | | |
| | M-230G | 2.5 | 2.5 | 2.5 | |
| | 2HEMA | | | | |
| | FM-7711 | | | | |
| | FM-7721 | | | | |
| | S-1 | | | | |
| | S-2 | | | | |
| | MAA | 2.5 | 5 | | 5 |
| | AA | 2.5 | | 7 | 5 |
| | Undecylenic acid | | | | |
| | Kayaester O | 12 | 12 | 12 | 12 |
| | Kayabutyl B | | | | |
| | PGM | 3.5 | 3.5 | 3.5 | 3.5 |
| Solution B dropped | KP-358 | 25 | 25 | 25 | 25 |
| | Butyl acetate | 12.5 | 12.5 | 12.5 | 12.5 |
| Additional catalyst dropped | Kayaester O | 1 | 1 | 1 | 1 |
| | Kayabutyl B | | | | |
| | Butyl acetate | 4.5 | 4.5 | 4.5 | 4.5 |
| Total | | 194.8 | 194.8 | 194.8 | 194.8 |

TABLE 2-continued

| Solution properties | | | | | |
|---|---|---|---|---|---|
| Solution appearance | | transparent | transparent | transparent | transparent |
| Film appearance | | transparent | transparent | transparent | transparent |
| NV (%) | | 52.4 | 52.1 | 53.3 | 53.2 |
| Viscosity (mPa · s/25° C.) | | 111 | 66 | 75 | 87 |
| Acid value | | 19.6 | 17.7 | 28.0 | 37.2 |
| (Theoretical acid value) | | (18.4) | (16.7) | (28.0) | (36.7) |
| Calculated Tg (° C.) | | 29.1 | 16.1 | 17.5 | 12.1 |
| Molecular weight: Mw | | 6,510 | 6,610 | 6,350 | 6,160 |

(the upper right section)

| | | Ex. 5 | Ex. 6 | Ex. 7 | Ex. 8 |
|---|---|---|---|---|---|
| Symbols of metal-crosslinked copolymers | | A-5 | A-6 | A-7 | A-8 |
| Blending | B-1 | | | | |
| | B-2 | | | | |
| | B-3 | | | | |
| | B-4 | | | | |
| | B-5 | 794.8 | | | |
| | B-6 | | 798.7 | | |
| | B-7 | | | 783.9 | |
| | B-8 | | | | 790.8 |
| | ZnO | 15.22 | 15.38 | 19.54 | 13.02 |
| | $H_2O$ | 10.1 | 10.21 | 12.96 | 8.64 |
| | ZnO | 15.22 | 15.38 | 19.54 | 13.02 |
| | Butyl acetate | 38.45 | 36.74 | 38.26 | 38.66 |
| | PGM | 25.66 | 24.49 | 25.49 | 25.76 |
| Total | | 899.45 | 900.9 | 899.69 | 889.9 |
| Blending ratio | | | | | |
| Organopolysiloxane-thio block copolymer (equivalent) | | 2 | 2 | 2 | 2 |
| $H_2O$ (mol) | | 1.5 | 1.5 | 1.5 | 1.5 |
| ZnO (mol) | | 0.5 + 0.5 | 0.5 + 0.5 | 0.5 + 0.5 | 0.5 + 0.5 |
| 90° C. reaction time (H) | | 15 H | 15 H | 15 H | 15 H |
| Solution properties | | | | | |
| NV (%) | | 49.5 | 49.3 | 49.8 | 50.2 |
| Viscosity (mPa · s/25° C.) | | 3,980 | 4,970 | 1,140 | 2,120 |
| Water content (%) | | not measured | not measured | not measured | not measured |
| Theoretical water content (%) | | (1.87) | (1.89) | (2.40) | (1.62) |
| Film transparency | | clear | clear | clear | clear |

(the lower right section)

| | | Ex. 5 | Ex. 6 | Ex. 7 | Ex. 8 |
|---|---|---|---|---|---|
| Symbols of organopolysiloxane-thio block vinyl copolymers | | B-5 | B-6 | B-7 | B-8 |
| Blending | | | | | |
| Reaction container, initial stage | Butyl acetate | 32.1 | 32.1 | 32.1 | 32.1 |
| | PGM | 29.2 | 29.2 | 29.2 | 29.2 |
| Solution A dropped | MMA | 15 | 10 | | 37.5 |
| | BMA | 15 | 15 | 5 | 5 |
| | BA | 20 | 20 | 35 | 12.5 |
| | 2EHA | 5 | 5 | 5 | |
| | CHA | 5 | | | 5 |
| | CHMA | | 10 | 10 | |
| | M-230G | | | | |
| | 2HEMA | | | | |
| | FM-7711 | | | | |
| | FM-7721 | | | | |
| | S-1 | | | | |
| | S-2 | | | | |
| | MAA | 7.5 | 7.5 | 10 | 5 |
| | AA | 7.5 | 7.5 | 10 | 5 |
| | Undecylenic acid | | | | 5 |
| | Kayaester O | 12 | 12 | 12 | 12 |
| | Kayabutyl B | | | | 4 |
| | PGM | 3.5 | 3.5 | 3.5 | 3.5 |

TABLE 2-continued

| | | | | | |
|---|---|---|---|---|---|
| Solution B | KP-358 | 25 | 25 | 25 | 25 |
| dropped | Butyl acetate | 12.5 | 12.5 | 12.5 | 12.5 |
| Additional | Kayaester O | 1 | 1 | 1 | 1 |
| catalyst | Kayabutyl B | | | | 0.5 |
| dropped | Butyl acetate | 4.5 | 4.5 | 4.5 | 4.5 |
| Total | | 194.8 | 194.8 | 194.8 | 199.3 |

Solution properties

| | | | | |
|---|---|---|---|---|
| Solution appearance | transparent | transparent | transparent | transparent |
| Film appearance | opaque | slightly opaque | opaque | transparent |
| NV (%) | 53.6 | 53.4 | 53.5 | 53.7 |
| Viscosity (mPa · s/25° C.) | 74 | 72 | 63 | 93 |
| Acid value | 52.8 | 53.1 | 68.7 | 45.4 |
| (Theoretical acid value) | (55.1) | (55.1) | (73.4) | (43.4) |
| Calculated Tg (° C.) | −7.5 | −6.9 | −20.8 | |
| Molecular weight: Mw | 5,860 | 6,040 | 4,930 | 6,140 |

Copolymers (Examples) (the upper left section)

| | | Ex. 9 | Ex. 10 | Ex. 11 | Ex. 12 |
|---|---|---|---|---|---|
| Symbols of metal-crosslinked copolymers | | A-9 | A-10 | A-11 | A-12 |
| Blending | B-9 | 827.1 | | | |
| | B-10 | | 829.3 | | |
| | B-11 | | | 766 | |
| | B-12 | | | | 759.9 |
| | B-13 | | | | |
| | B-14 | | | | |
| | B-15 | | | | |
| | B-16 | | | | |
| | ZnO | 10.5 | 10.38 | 8.67 | 8.63 |
| | $H_2O$ | 6.97 | 6.89 | 5.75 | 5.72 |
| | ZnO | 10.5 | 10.38 | 8.67 | 8.63 |
| | Copper acetate | | | | |
| | Butyl acetate | 27.66 | 25.7 | 66.69 | 69.83 |
| | PGM | 18.42 | 17.14 | 44.45 | 46.56 |
| | Xylene | | | | |
| | 20% KF-96-1000 | | | | |
| | Solvent recovered | | | | |
| | Xylene | | | | |
| Total | | 901.15 | 899.79 | 900.23 | 899.27 |

Blending ratio

| | | | | |
|---|---|---|---|---|
| Organopolysiloxane-thio block copolymer (equivalent) | 2 | 2 | 2 | 2 |
| $H_2O$ (mol) | 1.5 | 1.5 | 1.5 | 1.5 |
| ZnO (mol) | 0.5 + 0.5 | 0.5 + 0.5 | 0.5 + 0.5 | 0.5 + 0.5 |
| Copper acetate (mol) | | | | |
| 90° C. reaction time (H) | 15 H | 15 H | 15 H | 15 H |
| Time for temperature elevation up to 150° C. | | | | |

Solution properties

| | | | | |
|---|---|---|---|---|
| NV (%) | 49.7 | 49.9 | 49.7 | 50 |
| Viscosity (mPa · s/25° C.) | 1,670 | 870 | 29,850 | 18,620 |
| Water content (%) | not measured | not measured | not measured | not measured |
| Theoretical water content (%) | (1.29) | (1.28) | (1.06) | (1.06) |
| Film transparency | clear | clear | clear | clear |

(the lower left section)

| | | Ex. 9 | Ex. 10 | Ex. 11 | Ex. 12 |
|---|---|---|---|---|---|
| Symbols of organopolysiloxane-thio block vinyl copolymers | | B-9 | B-10 | B-11 | B-12 |

Blending

| | | | | | |
|---|---|---|---|---|---|
| Reaction | Butyl acetate | 33.4 | 33.4 | 32.1 | 32.1 |
| container, | PGM | 30.1 | 30.1 | 29.2 | 29.2 |
| initial stage | Xylene | | | | |
| Solution A | MMA | 36.5 | 30.5 | 39 | 39 |
| dropped | BMA | | | 17.5 | 17.5 |

TABLE 2-continued

| | | | | | |
|---|---|---|---|---|---|
| | BA | 10 | 10 | | |
| | 2EHA | 12.5 | 12.5 | 3.5 | 3.5 |
| | CHA | | | | 5 |
| | CHMA | | | 5 | |
| | M-230G | | | | |
| | 2HEMA | | | | |
| | FM-7711 | 6 | | | |
| | FM-7721 | | 12 | | |
| | S-1 | | | 33.33 | |
| | S-2 | | | | 33.33 |
| | MAA | 5 | 5 | 5 | 5 |
| | AA | 5 | 5 | 5 | 5 |
| | Undecylenic acid | | | | |
| | Kayaester O | 15 | 15 | 12 | 12 |
| | Kayabutyl B | | | | |
| | PGM | 3.5 | 3.5 | 5.72 | 5.72 |
| Solution B | KP-358 | 25 | 25 | 25 | 25 |
| dropped | Butyl acetate | 12.5 | 12.5 | 12.5 | 12.5 |
| Additional | Kayaester O | 1 | 1 | 1 | 1 |
| catalyst | Kayabutyl B | | | | |
| dropped | Butyl acetate | 4.5 | 4.5 | 4.5 | 4.5 |
| Total | | 200 | 200 | 230.35 | 230.35 |
| | | Solution properties | | | |
| Solution appearance | | transparent | transparent | transparent | transparent |
| Film appearance | | transparent | transparent | transparent | transparent |
| NV (%) | | 53.7 | 53.3 | 57 | 57.4 |
| Viscosity (mPa · s/25° C.) | | 93 | 102 | 180 | 172 |
| Acid value | | 45.4 | 37 | 31.2 | 31.3 |
| (Theoretical acid value) | | (43.4) | (36.7) | (31.0) | (31.0) |
| Calculated Tg (° C.) | | | | | |
| Molecular weight: Mw | | 7,100 | 7,080 | 11,550 | 9,490 |

(the upper right section)

| | | Ex. 13 | Ex. 14 | Ex. 15 | Ex. 16 |
|---|---|---|---|---|---|
| Symbols of metal-crosslinked copolymers | | A-13 | A-14 | A-15 | A-16 |
| Blending | B-9 | | | | |
| | B-10 | | | | |
| | B-11 | | | | |
| | B-12 | | | | |
| | B-13 | 825 | | | |
| | B-14 | | 818.2 | | |
| | B-15 | | | 810 | |
| | B-16 | | | | 644.2 |
| | ZnO | 8.14 | 8.22 | 10.99 | |
| | $H_2O$ | 5.4 | 5.45 | 7.92 | |
| | ZnO | 8.14 | 8.22 | 10.99 | |
| | Copper acetate | | | | 41.73 |
| | Butyl acetate | 34.88 | 34.64 | 31.16 | |
| | PGM | 23.24 | 23.09 | 20.79 | |
| | Xylene | | | | 142.03 |
| | 20% KF-96-1000 | | | | 0.36 |
| | Solvent recovered | | | | −327.6 |
| | Xylene | | | | 397.5 |
| Total | | 904.8 | 897.82 | 891.22 | 898.22 |
| | | Blending ratio | | | |
| Organopolysiloxane-thio block copolymer (equivalent) | | 2 | 2 | 2 | 2 |
| $H_2O$ (mol) | | 1.5 | 1.5 | 1.5 | 0 |
| ZnO (mol) | | 0.5 + 0.5 | 0.5 + 0.5 | 0.5 + 0.5 | |
| Copper acetate (mol) | | | | | 1 |
| 90° C. reaction time (H) | | 19 H | 21 H | 15 H | 4 H |
| Time for temperature elevation up to 150° C. | | | | | 4.5 H |

TABLE 2-continued

| | | | | | |
|---|---|---|---|---|---|
| Solution properties | | | | | |
| NV (%) | | 49.8 | 50.0 | 49.6 | 40.2 |
| Viscosity (mPa · s/25° C.) | | 940 | 770 | 20,170 | 19,610 |
| Water content (%) | | not measured | not measured | not measured | not measured |
| Theoretical water content (%) | | (0.99) | (1.01) | (1.36) | (0) |
| Film transparency | | clear | clear | clear | clear |

(the lower right section)

| | | Ex. 13 | Ex. 14 | Ex. 15 | Ex. 16 |
|---|---|---|---|---|---|
| Symbols of organopolysiloxane-thio block vinyl copolymers | | B-13 | B-14 | B-15 | B-16 |
| Blending | | | | | |
| Reaction container, initial stage | Butyl acetate | 43.1 | 43.1 | 32.1 | |
| | PGM | 38.79 | 38.79 | 29.2 | 21 |
| | Xylene | | | | 40.3 |
| Solution A dropped | MMA | 32.5 | 37.5 | 40 | 42.5 |
| | BMA | | | | |
| | BA | 10 | 10 | 15 | 10 |
| | 2EHA | 12.5 | 12.5 | | 12.5 |
| | CHA | | | | |
| | CHMA | | | | |
| | M-230G | | | | |
| | 2HEMA | | | | |
| | FM-7711 | | 5 | | |
| | FM-7721 | 10 | | | |
| | S-1 | 33.33 | | | |
| | S-2 | | 33.33 | | |
| | MAA | 5 | 5 | 5 | 5 |
| | AA | 5 | 5 | 5 | 5 |
| | Undecylenic acid | | | | |
| | Kayaester O | 15 | 15 | 10.4 | 12 |
| | Kayabutyl B | | | | |
| | PGM | 3.5 | 3.5 | 3.5 | 3.5 |
| Solution B dropped | KP-358 | 25 | 25 | 35 | 25 |
| | Butyl acetate | 12.5 | 12.5 | 12.5 | 12.5 |
| Additional catalyst dropped | Kayaester O | 1 | 1 | 1 | 1 |
| | Kayabutyl B | | | | |
| | Butyl acetate | 4.5 | 4.5 | 4.5 | 4.5 |
| Total | | 251.72 | 251.72 | 193.2 | 194.8 |
| Solution properties | | | | | |
| Solution appearance | | transparent | transparent | transparent | transparent |
| Film appearance | | transparent | transparent | transparent | transparent |
| NV (%) | | 53.3 | 53.3 | 52.9 | 53.7 |
| Viscosity (mPa · s/25° C.) | | 55 | 54 | 99 | 90 |
| Acid value | | 27.2 | 27.7 | 37.4 | 36.4 |
| (Theoretical acid value) | | (28.4) | (28.4) | (36.7) | (36.7) |
| Calculated Tg (° C.) | | | | | 12.1 |
| Molecular weight: Mw | | 11,560 | 8,690 | 7,630 | 6,140 |

Comparative Example 1

Copolymer H-1

In a reaction container equipped with a stirring device, a thermometer, a nitrogen gas feed pipe, a dropping device and a reflux condenser, 40.5 parts by weight of butyl acetate, 25 parts by weight of KF-2001 (trade name "KF-2001", mercapto modified silicone available from Shin-Etsu Chemical Co., Ltd., weight-average molecular weight (Mw): 9,200, solids content: 100% by weight, position of SH group: side-chain type) and 2.5 parts by weight of methoxypolyethylene glycol methacrylate (trade name "NK Ester M-230G", available from Shin-Nakamura Chemical Co., Ltd., number of —$C_2H_4$—O— units: 23 (mean value), solids content: 100% by weight) were placed, and the temperature was raised up to 110° C. in a nitrogen gas atmosphere. Subsequently, a mixture A consisting of 42.5 parts by weight of methyl methacrylate (MMA), 20 parts by weight of N-butyl methacrylate (BMA), 10 parts by weight of 2-ethylhexyl acrylate (2EHA) and 2.5 parts by weight of t-butyl peroxy-2-ethylhexanoate (trade name "Kayaester 0", available from Kayaku Akzo Corporation, peroxide) as a polymerization initiator as shown in Table 3 was dropwise added over a period of 3 hours with maintaining the internal temperature at 120° C. One hour after the completion of the dropwise addition of the mixture A, 1 part by weight of a butyl acetate solution of t-butyl peroxy-2-ethylhexanoate (20% by weight) was further added three times every 45 minutes, and then the resulting mixture was stirred for 1.5 hours with retaining heat to obtain a copolymer H-1 solution. This copolymer H-1 solution had a transparent appearance, and a film of the copolymer had a transparent appearance. The copolymer H-1 solution had NV (heating residue after drying for 3 hours in a hot air dryer at 108° C.) of 64.3% by weight and a viscosity of 6,800 mPa·s/25° C. The weight-average molecular weight (Mw) of the copolymer H-1, as measured by GPC, was 31,710.

Blending ratio (part(s) by weight) of the components, the catalyst, the solvent, the reaction temperature, etc. in the preparation of the copolymer H-1 solution, properties of the resulting copolymer H-1 solution, etc. are set forth in Table 3.

Comparative Examples 2 and 3

Copolymers H-2 to H-3 solutions were each synthesized in the same manner as that for the copolymer B-1 solution in Example 1, except that the blending ratio was changed as shown in Table 3. Properties of the copolymers were evaluated in the same manner as in Example 1. Blending ratio (part(s) by weight) of the raw materials, the catalyst, the solvent, the reaction temperature, etc. in the preparation of the copolymers H-2 to H-3 solutions, properties of the resulting copolymers H-2 to H-3 solutions, etc. are set forth in Table 3.

Comparative Example 4

Copolymer H-4

In a reaction container equipped with a stirring device, a thermometer, a nitrogen gas feed pipe, a dropping device and a reflux condenser, 66.66 parts by weight of xylene were placed, and the temperature was raised up to 90° C. in a nitrogen gas atmosphere. Subsequently, a mixture A consisting of 40 parts by weight of methyl methacrylate (MMA), 60 parts by weight of N-butyl methacrylate (BMA) and 3.2 parts by weight of 2,2'-azobis(2-methylbutyronitrile) (trade name "ABN-E", available from Japan Hydrazine Company Inc., azo compound) as a polymerization initiator as shown in Table 3 was dropwise added over a period of 2 hours with maintaining the internal temperature at 90° C. One hour after the completion of the dropwise addition of the mixture A, 0.05 part by weight of 2,2'-azobisisobutyronitrile (trade name "ABN-R", available from Japan Hydrazine Company Inc., azo compound) was added, and the temperature was raised up to 95° C. over a period of 4 hours. Then, 0.1 part by weight of 2,2'-azobisisobutyronitrile was added twice every 30 minutes. Thereafter, the temperature was raised up to 105° C., and the resulting mixture was stirred for 30 minutes with retaining heat to obtain a copolymer H-4 solution. This copolymer H-4 solution had a transparent appearance, and a film of the copolymer had a transparent appearance. The copolymer H-4 solution had NV (heating residue after drying for 3 hours in a hot air dryer at 108° C.) of 59.5% by weight and a viscosity of 5,640 mPa·s/25° C. The weight-average molecular weight (Mw) of the copolymer H-4, as measured by GPC, was 14,816.

Blending ratio (part(s) by weight) of the components, the catalyst, the solvent, the reaction temperature, etc. in the preparation of the copolymer H-4 solution, properties of the resulting copolymer H-4 solution, etc. are set forth in Table 3.

TABLE 3

| Copolymers (Comparative Examples) | | | | | |
|---|---|---|---|---|---|
| | | Comp. Ex. 1 | Comp. Ex. 2 | Comp. Ex. 3 | Comp. Ex. 4 |
| Symbols of organopolysiloxane-thio block vinyl copolymers | | H-1 | H-2 | H-3 | H-4 |
| Blending | | | | | |
| Reaction container, initial stage | Butyl acetate | 40.5 | 32.1 | 32.1 | |
| | PGM | | 29.2 | 29.2 | |
| | Xylene | | | | 66.66 |
| | KF-2001 | 25 | | | |
| | M-230G | 2.5 | | | |
| Solution A dropped | MMA | 42.5 | 42.5 | 12.5 | 40 |
| | BMA | 20 | | | 60 |
| | BA | | 10 | 30 | |
| | 2EHA | 10 | 10 | 10 | |
| | M-230G | | 2.5 | 2.5 | |
| | MAA | | 5 | 10 | |
| | AA | | 5 | 10 | |
| | Kayaester O | 2.5 | 12 | 12 | |
| | PGM | | 3.5 | 3.5 | |
| | ABN-E | | | | 3.2 |
| Solution B dropped | KP-358 | | 25 | 25 | |
| | Butyl acetate | | 12.5 | 12.5 | |
| Additional catalyst dropped | Kayaester O | | 1 | 1 | |
| | Butyl acetate | | 4.5 | 4.5 | |
| Additional catalyst | 20% Kayaester O | 3 | | | |
| | ABN-R | | | | 0.3 |
| Dilution solvent | Butyl acetate | 8 | | | |
| Total | | 154.0 | 194.8 | 194.8 | 170.16 |
| Solution properties | | | | | |
| Solution appearance | | transparent | transparent | transparent | transparent |
| Film appearance | | opaque | slightly opaque | opaque | transparent |
| NV (%) | | 64.3 | 53.5 | 53.8 | 59.5 |
| Viscosity (mPa · s/25° C.) | | 6,800 | 90.0 | 86.0 | 5,640 |
| Acid value | | — | 36.7 | 68.9 | — |
| (Theoretical acid value) | | | (36.7) | (73.4) | |
| Calculated Tg (° C.) | | 12.5 | 10 | −18.2 | 50 |
| Molecular weight: Mw | | 31,710 | 6,580 | 5,560 | 14,816 |

Preparation of Antifouling Coating Composition

Example F-1

As shown in Table 4, 100 parts by weight of the metal-crosslinked copolymer A-1 solution (NV: 52.7%), 5 parts by weight of KF-54 silicone oil (trade name "KF-54", available from Shin-Etsu Chemical Co., Ltd., methyl phenyl silicone oil) and 10 parts by weight of KF-6016 (trade name "KF-6016", available from Shin-Etsu Chemical Co., Ltd., side-chain type polyether modified silicone oil, HLB: 3.5) as a water-repellent component and a hydrophilic component, respectively, 0.5 part by weight of KF-96-1000 (trade name "KF-96-1000", available from Shin-Etsu Chemical Co., Ltd., dimethyl silicone oil) as an anti-foaming agent, 10 parts by weight of xylene as a solvent, 1.5 parts by weight of Fuji First Red 2305W (trade name "Fuji First Red 2305W", available from Fuji Pigment Co., Ltd., organic red pigment)- and 3 parts by weight of titanium oxide (trade name "R-5N", available from Sakai Chemical Industry Co., Ltd.) as pigments, and 6 parts by weight of Disperon 6900-10× (trade name "Disperon 6900-10×, available from Kusumoto Chemicals, Ltd., fatty acid amide wax, 10% xylene paste) as an additive (thixotropic agent) were placed in a paint shaker containing glass beads as media, and they were shaken for 2 hours and then filtered through a filter of 20 meshes to prepare an antifouling coating composition.

Examples F-2 to F-24

Comparative Examples HF-1 to HF-4

Antifouling coating compositions were prepared in the same manner as in Example F-1, except that the type of the copolymer solution and the amounts of the components were changed as shown in Table 4 (examples) and Table 5 (comparative examples).

<Coating Film Performance Evaluation Test>

Evaluation of antifouling performance of the antifouling coating compositions was carried out. The results are set forth in Table 4 (examples) and Table 5 (comparative examples). The evaluation test methods are as follows.

[Antifouling Test in Constant-Submerged State]

To a sandblasted steel plate of 100 mm×300 mm×2.3 mm, an epoxy-based zinc-rich primer ("Epicon Zinc Rich Primer B-2" available from Chugoku Marine Paints, Ltd.), an epoxy-based anticorrosive coating material ("Bannoh 500" available from Chugoku Marine Paints, Ltd.) and an epoxy-based anticorrosive coating material ("Bannoh 500R" available from Chugoku Marine Paints, Ltd.) were applied by means of an air spray so that their dry film thicknesses would become 20 μm, 150 μm and 100 μm, respectively. To the surface of the epoxy-based binder coating film formed, the antifouling coating composition was applied so that the dry film thickness would become 150 μm, whereby a test plate was prepared. The test plate was dried indoors for 1 week, then from a raft placed in Hiroshima Bay, it was hung and immersed in seawater in such a manner that it was positioned 1 m below the surface of the seawater, and adhesion of organisms over a period of 18 months was visually observed.

Evaluation was carried out by visually observing the area (%) of adhesion of macro-organisms.

5 points: The area of adhesion of marine organisms is 0%.

4 points: The area of adhesion of marine organisms is not more than 5%.

3 points: The area of adhesion of marine organisms is more than 5% but not more than 10%.

2 points: The area of adhesion of marine organisms is more than 10% but not more than 25%.

1 point: The area of adhesion of marine organisms is more than 25% but not more than 50%.

0 point: The area of adhesion of marine organisms is more than 50%.

[Antifouling Test in Half-Submerged State]

To a sandblasted steel plate of 100 mm×300 mm×2.3 mm, an epoxy-based zinc-rich primer ("Epicon Zinc Rich Primer B-2" available from Chugoku Marine Paints, Ltd.), an epoxy-based anticorrosive coating material ("Bannoh 500" available from Chugoku Marine Paints, Ltd.) and an epoxy-based anticorrosive coating material ("Bannoh 500R" available from Chugoku Marine Paints, Ltd.) were applied by means of an air spray so that their dry film thicknesses would become 20 μm, 150 μm and 100 μm, respectively. To the surface of the epoxy-based binder coating film formed, the antifouling coating composition was applied so that the dry film thickness would become 150 μm, and then dried indoors for 1 week to prepare a test plate. From a raft placed in Hiroshima Bay, the test plate was hung and immersed in seawater in such a manner that a half of it was below the surface of the seawater, and adhesion of organisms over a period of 18 months was visually observed.

Evaluation was carried out by visually observing the area (%) of adhesion of macro-organisms.

5 points: The area of adhesion of marine organisms is 0%.

4 points: The area of adhesion of marine organisms is not more than 5%.

3 points: The area of adhesion of marine organisms is more than 5% but not more than 10%.

2 points: The area of adhesion of marine organisms is more than 10% but not more than 25%.

1 point: The area of adhesion of marine organisms is more than 25% but not more than 50%.

0 point: The area of adhesion of marine organisms is more than 50%.

[Recoatability Evaluation]

To a curved sandblasted steel plate of 70 mm×150 mm×2.3 mm, an epoxy-based zinc-rich primer ("Epicon Zinc Rich Primer B-2" available from Chugoku Marine Paints, Ltd.), an epoxy-based anticorrosive coating material ("Bannoh 500" available from Chugoku Marine Paints, Ltd.) and an epoxy-based anticorrosive coating material ("Bannoh 500R" available from Chugoku Marine Paints, Ltd.) were applied by means of an air spray so that their dry film thicknesses would become 20 μm, 150 μm and 100 μm, respectively. After drying, the antifouling coating composition was applied by means of an applicator so that the dry film thickness would become 150 μm, and then dried indoors for 1 week to prepare a test specimen. The specimen was fixed to a marine rotating device placed in Hiroshima Bay and rotated at 15 Kn for 6 months. The specimen was recovered, washed with fresh water, dried for 1 day and then top-coated with the same antifouling coating composition as above so that the dry film thickness would become 150 μm. At the center of the specimen, a cut of 60° reaching the undercoating material was made, and the specimen was fixed to the rotating device and rotated to perform a test of adhesion of the antifouling coating films to each other.

Crosscut Test Evaluation Criteria 5 points: The antifouling coating film does not peel.

4 points: The antifouling coating film partially peels in dots along the cut line.

3 points: The antifouling coating films partially peels with a width of about 1 mm along the cut line.

2 points: Most of the antifouling coating film peels with a width of about 2 mm along the cut line.

1 point: The antifouling coating film considerably peels at the crosscut portion, and a part of the coating film remains.

0 point: Most of the antifouling coating film peels.

TABLE 4

Copolymer compositions (Examples) (the left section)

| | Components | Examples | | | |
|---|---|---|---|---|---|
| | | F-1 | F-2 | F-3 | F-4 |
| Metal-crosslinked copolymer solution | A-1 | 100 | 100 | | |
| | A-2 | | | 100 | |
| | A-3 | | | | 100 |
| | A-4 | | | | |
| | A-5 | | | | |
| | A-6 | | | | |
| | A-7 | | | | |
| | A-8 | | | | |
| Pigment | Fuji First Red 2305W | 1.5 | 1.5 | 1.5 | 1.5 |
| | R-5 | 3 | 3 | 3 | 3 |
| Anti-foaming agent | KF-96-1000 | 0.5 | 0.5 | 0.5 | 0.5 |

TABLE 4-continued

| | | | | | |
|---|---|---|---|---|---|
| Water-repellent component | KF-50-3000 | | 2.5 | 2.5 | |
| | KF-54 | 5 | | | |
| Hydrophilic component | KF-6016 | 10 | | 10 | |
| | ST-114PA | | 7.5 | | |
| | FZ-2191 | | | | |
| | X-22-4272 | | | | 10 |
| | FZ-2203 | | | | |
| | KF-6028 | | | | |
| Antifouling agent | Copper suboxide | | | | |
| | Pyridine-triphenylborane | | 3 | | |
| | Zinc 2-pyridinethiol-1-oxide | | | | |
| | 4,5-Dichloro-2-N-octyl-4-isothiazolin-3-one | | | | |
| Additive | Dis.6900-10X | 6 | 6 | 6 | 6 |
| Solvent | Xylene | 10 | 15 | 5 | 5 |
| | Butyl acetate | | | | |
| | Total | 136 | 139 | 129 | 126 |

Results of coating film performance evaluation

| | | | | | |
|---|---|---|---|---|---|
| Recoatability | 60° crosscut test | 5 | 5 | 5 | 5 |
| Antifouling test in constant-submerged state | 3 months | 5 | 5 | 5 | 5 |
| | 6 months | 5 | 5 | 5 | 5 |
| | 9 months | 5 | 5 | 5 | 5 |
| | 15 months | 5 | 5 | 5 | 5 |
| | 18 months | 5 | 5 | 5 | 5 |
| Antifouling test in half-submerged state | 3 months | 5 | 5 | 5 | 5 |
| | 6 months | 5 | 5 | 5 | 5 |
| | 9 months | 5 | 5 | 5 | 5 |
| | 15 months | 5 | 5 | 5 | 5 |
| | 18 months | 5 | 5 | 5 | 5 |

(the middle section)

| | | Examples | | | |
|---|---|---|---|---|---|
| | Components | F-5 | F-6 | F-7 | F-8 |
| Metal-crosslinked copolymer solution | A-1 | | | | |
| | A-2 | | | | |
| | A-3 | | | | |
| | A-4 | 100 | 100 | | |
| | A-5 | | | 100 | 100 |
| | A-6 | | | | |
| | A-7 | | | | |
| | A-8 | | | | |
| Pigment | Fuji First Red 2305W | 1.5 | 3 | 1.5 | 1.5 |
| | R-5 | 3 | | 3 | 3 |
| Anti-foaming agent | KF-96-1000 | 0.5 | 0.5 | 0.5 | 0.5 |
| Water-repellent component | KF-50-3000 | | | | |
| | KF-54 | | | | 10 |
| Hydrophilic component | KF-6016 | | | | |
| | ST-114PA | | | | |
| | FZ-2191 | 5 | | | |
| | X-22-4272 | 5 | | | |
| | FZ-2203 | | 7 | | |
| | KF-6028 | | | 10 | |
| Antifouling agent | Copper suboxide | | 7.5 | | |
| | Pyridine-triphenylborane | | | | 5 |
| | Zinc 2-pyridinethiol-1-oxide | | | 2.5 | |
| | 4,5-Dichloro-2-N-octyl-4-isothiazolin-3-one | | 2.5 | | |
| Additive | Dis.6900-10X | 6 | 6 | 6 | 6 |
| Solvent | Xylene | 20 | 20 | 20 | 20 |
| | Butyl acetate | 5 | 10 | | |
| | Total | 146 | 157 | 144 | 146 |

Results of coating film performance evaluation

| | | | | | |
|---|---|---|---|---|---|
| Recoatability | 60° crosscut test | 5 | 5 | 5 | 5 |
| Antifouling test in constant-submerged state | 3 months | 5 | 5 | 5 | 5 |
| | 6 months | 5 | 5 | 5 | 5 |
| | 9 months | 5 | 5 | 5 | 5 |
| | 15 months | 5 | 5 | 5 | 5 |
| | 18 months | 5 | 5 | 5 | 5 |
| Antifouling test in half-submerged state | 3 months | 5 | 5 | 5 | 5 |
| | 6 months | 5 | 5 | 5 | 5 |
| | 9 months | 5 | 5 | 5 | 5 |
| | 15 months | 5 | 5 | 5 | 5 |
| | 18 months | 5 | 5 | 5 | 5 |

(the right section)

| | | Examples | | | |
|---|---|---|---|---|---|
| | Components | F-9 | F-10 | F-11 | F-12 |
| Metal-crosslinked copolymer solution | A-1 | | | | |
| | A-2 | | | | |
| | A-3 | | | | |
| | A-4 | | | | |
| | A-5 | | | | |
| | A-6 | 100 | | | |
| | A-7 | | 100 | 100 | |
| | A-8 | | | | 100 |
| Pigment | Fuji First Red 2305W | 1.5 | 1.5 | 0.5 | 1.5 |
| | R-5 | 3 | 3 | 5 | 3 |
| Anti-foaming agent | KF-96-1000 | 0.5 | 0.5 | 0.5 | 0.5 |
| Water-repellent component | KF-50-3000 | | 5 | | 2.5 |
| | KF-54 | | | | |
| Hydrophilic component | KF-6016 | 15 | | | |
| | ST-114PA | | | | |
| | FZ-2191 | | | | 10 |
| | X-22-4272 | | | | |
| | FZ-2203 | | 10 | | |
| | KF-6028 | | | | |
| Antifouling agent | Copper suboxide | | | 5 | |
| | Pyridine-triphenylborane | | | 5 | |
| | Zinc 2-pyridinethiol-1-oxide | | | | |
| | 4,5-Dichloro-2-N-octyl-4-isothiazolin-3-one | | | | |
| Additive | Dis.6900-10X | 6 | 6 | 6 | 6 |
| Solvent | Xylene | 10 | 5 | 15 | 10 |
| | Butyl acetate | | | | |
| | Total | 136 | 131 | 137 | 134 |

Results of coating film performance evaluation

| | | | | | |
|---|---|---|---|---|---|
| Recoatability | 60° crosscut test | 5 | 5 | 5 | 5 |
| Antifouling test in constant-submerged state | 3 months | 5 | 5 | 5 | 5 |
| | 6 months | 5 | 5 | 5 | 5 |
| | 9 months | 5 | 5 | 5 | 5 |
| | 15 months | 5 | 5 | 5 | 5 |
| | 18 months | 5 | 5 | 5 | 5 |
| Antifouling test in half-submerged state | 3 months | 5 | 5 | 5 | 5 |
| | 6 months | 5 | 5 | 5 | 5 |
| | 9 months | 5 | 5 | 5 | 5 |
| | 15 months | 5 | 5 | 5 | 5 |
| | 18 months | 5 | 5 | 5 | 5 |

Copolymer compositions (Examples) (the left section)

| | | Examples | | | |
|---|---|---|---|---|---|
| | Components | F-13 | F-14 | F-15 | F-16 |
| Metal-crosslinked copolymer solution | A-9 | 100 | 100 | | |
| | A-10 | | | 100 | 100 |
| | A-11 | | | | |
| | A-12 | | | | |
| | A-13 | | | | |
| | A-14 | | | | |
| | A-15 | | | | |
| | A-16 | | | | |

TABLE 4-continued

| | | | | | |
|---|---|---|---|---|---|
| Pigment | Fuji First Red 2305W | 1.5 | 0.5 | 1.5 | 1.5 |
| | R-5 | 3 | 5 | 3 | 3 |
| Anti-foaming agent | KF-96-1000 | 0.5 | 0.5 | 0.5 | 0.5 |
| Water-repellent component | KF-50-3000 | | | | |
| | KF-54 | 3 | | | |
| Hydrophilic component | KF-6016 | 10 | | | 5 |
| | ST-114PA | | 10 | | |
| | FZ-2191 | | | | |
| | X-22-4272 | | | 15 | |
| | FZ-2203 | | | | 5 |
| | KF-6028 | | | | |
| Antifouling agent | Copper suboxide | | | | |
| | Pyridine-triphenylborane | | 3 | | 2 |
| | Zinc 2-pyridinethiol-1-oxide | | | | 3 |
| | 4,5-Dichloro-2-N-octyl-4-isothiazolin-3-one | | | | |
| Additive | Dis.6900-10X | 6 | 6 | 6 | 6 |
| Solvent | Xylene | 5 | 15 | 5 | 15 |
| | Butyl acetate | | | | |
| | Total | 129 | 140 | 131 | 141 |

Results of coating film performance evaluation

| | | | | | |
|---|---|---|---|---|---|
| Recoatability | 60° crosscut test | 5 | 5 | 5 | 5 |
| Antifouling test in constant-submerged state | 3 months | 5 | 5 | 5 | 5 |
| | 6 months | 5 | 5 | 5 | 5 |
| | 9 months | 5 | 5 | 5 | 5 |
| | 15 months | 5 | 5 | 5 | 5 |
| | 18 months | 5 | 5 | 5 | 5 |
| Antifouling test in half-submerged state | 3 months | 5 | 5 | 5 | 5 |
| | 6 months | 5 | 5 | 5 | 5 |
| | 9 months | 5 | 5 | 5 | 5 |
| | 15 months | 5 | 5 | 5 | 5 |
| | 18 months | 5 | 5 | 5 | 5 |

(the middle section)

| | | Examples | | | |
|---|---|---|---|---|---|
| | Components | F-17 | F-18 | F-19 | F-20 |
| Metal-crosslinked copolymer solution | A-9 | | | | |
| | A-10 | | | | |
| | A-11 | 100 | 100 | | |
| | A-12 | | | 100 | 100 |
| | A-13 | | | | |
| | A-14 | | | | |
| | A-15 | | | | |
| | A-16 | | | | |
| Pigment | Fuji First Red 2305W | 1.5 | 1.5 | 1.5 | 1.5 |
| | R-5 | 3 | 3 | 3 | 3 |
| Anti-foaming agent | KF-96-1000 | 0.5 | 0.5 | 0.5 | 0.5 |
| Water-repellent component | KF-50-3000 | 5 | | | |
| | KF-54 | | | 5 | |
| Hydrophilic component | KF-6016 | | | | |
| | ST-114PA | | | | |
| | FZ-2191 | | | | |
| | X-22-4272 | | | | |
| | FZ-2203 | | | | |
| | KF-6028 | | | | |
| Antifouling agent | Copper suboxide | | 10 | | |
| | Pyridine-triphenylborane | | | | 5 |
| | Zinc 2-pyridinethiol-1-oxide | | | | |
| | 4,5-Dichloro-2-N-octyl-4-isothiazolin-3-one | | | | |
| Additive | Dis.6900-10X | 6 | 6 | 6 | 6 |
| Solvent | Xylene | 20 | 20 | 20 | 20 |
| | Butyl acetate | 10 | 20 | 5 | 10 |
| | Total | 146 | 161 | 141 | 146 |

TABLE 4-continued

Results of coating film performance evaluation

| | | | | | |
|---|---|---|---|---|---|
| Recoatability | 60° crosscut test | 5 | 5 | 5 | 5 |
| Antifouling test in constant-submerged state | 3 months | 5 | 5 | 5 | 5 |
| | 6 months | 5 | 5 | 5 | 5 |
| | 9 months | 5 | 5 | 5 | 5 |
| | 15 months | 5 | 5 | 5 | 5 |
| | 18 months | 5 | 5 | 5 | 5 |
| Antifouling test in half-submerged state | 3 months | 5 | 5 | 5 | 5 |
| | 6 months | 5 | 5 | 5 | 5 |
| | 9 months | 5 | 5 | 5 | 5 |
| | 15 months | 5 | 5 | 5 | 5 |
| | 18 months | 5 | 5 | 5 | 5 |

(the right section)

| | | Examples | | | |
|---|---|---|---|---|---|
| | Components | F-21 | F-22 | F-23 | F-24 |
| Metal-crosslinked copolymer solution | A-9 | | | | |
| | A-10 | | | | |
| | A-11 | | | | |
| | A-12 | | | | |
| | A-13 | 100 | | | |
| | A-14 | | 100 | | |
| | A-15 | | | 100 | |
| | A-16 | | | | 100 |
| Pigment | Fuji First Red 2305W | 1.5 | 0.5 | 1.5 | 1.5 |
| | R-5 | 3 | 5 | 3 | 3 |
| Anti-foaming agent | KF-96-1000 | 0.5 | 0.5 | 0.5 | 0.5 |
| Water-repellent component | KF-50-3000 | | | | |
| | KF-54 | | | 2.5 | |
| Hydrophilic component | KF-6016 | | | | 10 |
| | ST-114PA | | | | |
| | FZ-2191 | 5 | | | |
| | X-22-4272 | | | 10 | |
| | FZ-2203 | | | | |
| | KF-6028 | | | | |
| Antifouling agent | Copper suboxide | | | | |
| | Pyridine-triphenylborane | | | | |
| | Zinc 2-pyridinethiol-1-oxide | | | | |
| | 4,5-Dichloro-2-N-octyl-4-isothiazolin-3-one | | | | |
| Additive | Dis.6900-10X | 6 | 6 | 6 | 6 |
| Solvent | Xylene | 5 | 5 | 20 | 20 |
| | Butyl acetate | | | 15 | 15 |
| | Total | 121 | 117 | 159 | 156 |

Results of coating film performance evaluation

| | | | | | |
|---|---|---|---|---|---|
| Recoatability | 60° crosscut test | 5 | 5 | 5 | 5 |
| Antifouling test in constant-submerged state | 3 months | 5 | 5 | 5 | 5 |
| | 6 months | 5 | 5 | 5 | 5 |
| | 9 months | 5 | 5 | 5 | 5 |
| | 15 months | 5 | 5 | 5 | 5 |
| | 18 months | 5 | 5 | 5 | 5 |
| Antifouling test in half-submerged state | 3 months | 5 | 5 | 5 | 5 |
| | 6 months | 5 | 5 | 5 | 5 |
| | 9 months | 5 | 5 | 5 | 5 |
| | 15 months | 5 | 5 | 5 | 5 |
| | 18 months | 5 | 5 | 5 | 5 |

TABLE 5

| Copolymer compositions (Comparative Examples) | | | | | |
|---|---|---|---|---|---|
| | | Comparative Examples | | | |
| | Components | H-1 | H-2 | H-3 | H-4 |
| Copolymer solution | H-1 | 100 | | | |
| | H-2 | | 100 | | |
| | H-3 | | | 100 | |
| | H-4 | | | | 100 |
| Pigment | Fuji First Red 2305W | 1.5 | 1.5 | 1.5 | 1.5 |
| | R-5 | 3 | 3 | 3 | 3 |
| Anti-foaming agent | KF-96-1000 | 0.5 | 0.5 | 0.5 | 0.5 |
| Water-repellent component | KF-50-3000 | 2.5 | | | |
| | KF-54 | | | | |
| Hydrophilic component | KF-6016 | 10 | | | 5 |
| | ST-114PA | | | | |
| | FZ-2191 | | | | |
| | X-22-4272 | | 10 | | |
| | FZ-2203 | | | | 5 |
| | KF-6028 | | | | |
| Antifouling agent | Copper suboxide | | | 10 | |
| | Pyridine-triphenylborane | | | | 2 |
| | Zinc 2-pyridinethiol-1-oxide | | | | 3 |
| | 4,5-Dichloro-2-N-octyl-4-isothiazolin-3-one | | | | |
| Additive | Dis.6900-10X | 6 | 6 | 6 | 6 |
| Solvent | Xylene | 20 | 5 | 5 | 20 |
| | Butyl acetate | 5 | | | 10 |
| | Total | 149 | 126 | 126 | 156 |
| Results of coating film performance evaluation | | | | | |
| Recoatability | 60° crosscut test | 2 | 1 | 1 | 1 |
| Antifouling test in constant-submerged state | 3 months | 5 | 4 | 4 | 5 |
| | 6 months | 5 | 1 | 1 | 1 |
| | 9 months | 5 | 1 | 1 | 1 |
| | 15 months | 5 | 1 | 1 | 1 |
| | 18 months | 5 | 1 | 1 | 1 |
| Antifouling test in half-submerged state | 3 months | 4 | 4 | 3 | 3 |
| | 6 months | 2 | 1 | 1 | 1 |
| | 9 months | 1 | 1 | 1 | 1 |
| | 15 months | 1 | 1 | 1 | 1 |
| | 18 months | 1 | 1 | 1 | 1 |

The invention claimed is:

1. A metal-crosslinked organopolysiloxane-thio block vinyl copolymer [D], comprising an organopolysiloxane-thio block vinyl copolymer [C] crosslinked with a divalent metal [M], said copolymer [C] comprising a carboxylic acid-containing vinyl copolymer block [A], formed from at least one constitutional unit derived from a polymerizable unsaturated carboxylic acid (a1) and at least one constitutional unit derived from at least one other polymerizable unsaturated monomer (a2) copolymerizable with the polymerizable unsaturated carboxylic acid (a1), and an organopolysiloxane-thio block [B] represented by the following formula [I]:

[I]

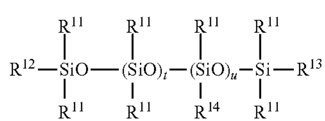

wherein:

each $R^{11}$ independently represents a hydrocarbon group of 1 to 10 carbon atoms;

$R^{12}$, $R^{13}$ and $R^{14}$ each independently represent $R^{11}$ or a divalent thio organic group of 1 to 20 carbon atoms, such that at least one of $R^{12}$, $R^{13}$ and $R^{14}$ is a divalent thio organic group of 1 to 20 carbon atoms;

t is an integer of not less than 0; and u is an integer of not less than 1.

2. The block vinyl copolymer [D] of claim 1, wherein the polymerizable unsaturated carboxylic acid (a1) is at least one selected from the group consisting of (meth)acrylic acid, maleic acid, fumaric acid, itaconic acid, citraconic acid and undecylenic acid.

3. The block vinyl copolymer [D] of claim 1, wherein the polymerizable unsaturated monomer (a2) is at least one selected from the group consisting of a (meth)acrylic acid ester, styrene, a vinyl ester, (meth)acrylamide, and a vinyl ether, or a combination of a polymerizable group-containing polyether modified silicone and at least one selected from the group consisting of a (meth)acrylic acid ester, styrene, a vinyl ester, (meth)acrylamide, and a vinyl ether.

4. The block vinyl copolymer [D] of claim 3, wherein:

the polymerizable unsaturated monomer (a2) is the combination of the polymerizable group-containing polyether modified silicone and at least one selected from the group consisting of a (meth)acrylic acid ester, styrene, a vinyl ester, (meth)acrylamide, and a vinyl ether; and an HLB of the polymerizable group-containing polyether modified silicone is not more than 18.

5. The block vinyl copolymer [D] of claim 1, wherein an acid value of the organopolysiloxane-thio block vinyl copolymer [C] is in the range of 1 to 200.

6. The block vinyl copolymer [D] of claim 1, wherein a glass transition temperature (Tg) of the organopolysiloxane-thio block vinyl copolymer [C] is in the range of −50° C. to 60° C.

7. The block vinyl copolymer [D] of claim 1, wherein a weight-average molecular weight (Mw) of the organopolysiloxane-thio block vinyl copolymer [C] is in the range of 1,000 to 200,000.

8. The block vinyl copolymer [D] of claim 1, wherein the divalent metal [M] is at least one selected from the group consisting of zinc, copper, cobalt, nickel, manganese, magnesium and calcium.

9. The block vinyl copolymer [D] of claim 1, wherein:

a proportion occupied by the carboxylic acid-containing vinyl copolymer block [A] is in the range of 5 to 98.5% by weight;

a proportion occupied by the organopolysiloxane-thio block [B] is in the range of 1 to 80% by weight; and a proportion occupied by the divalent metal [M] is in the range of 0.5 to 16% by weight, based on 100% by weight of a solids content.

10. The block vinyl copolymer [D] of claim 1, wherein a solution of the block vinyl copolymer [D] has a viscosity of 50 to 100,000 mPa·s/25° C. when a nonvolatile content of the solution is 50% by weight.

11. A metal-crosslinked organopolysiloxane-thio block vinyl copolymer composition, comprising:

the block vinyl copolymer [D] of claim 1, a solvent, and optionally a water-repellent component, a hydrophilic component, or both.

12. The composition of claim 11, comprising the water-repellent component, wherein the water-repellent component is at least one selected from the group consisting of dimethyl silicone oil, methyl phenyl silicone oil, fluorine-containing silicone oil, fluorine oil and a paraffin.

13. The composition of claim 11, comprising the hydrophilic component, wherein the hydrophilic component is a polyether modified silicone oil having an HLB of not more than 12.

14. The composition of claim 11, further comprising an antifouling agent.

15. An antifouling coating film formed from the composition of claim 11.

16. A substrate, wherein a surface of the substrate is coated with a coating film formed from the composition of claim 11 and dried.

17. An underwater structure, comprising a substrate whose surface is coated with the antifouling coating film of claim 15.

18. A ship, comprising a ship substrate whose surface is coated with the antifouling coating film of claim 15.

19. A method for preventing fouling of a substrate, the method comprising coating a surface of the substrate with the antifouling coating film of claim 15.

20. A process for preparing the block vinyl copolymer [D] of claim 1, the process comprising mixing the organopolysiloxane-thio block vinyl copolymer [C] with at least one compound selected from the group consisting of an oxide, a hydroxide, a chloride and an organic carboxylate of the divalent metal [M] to affect a metal esterification reaction.

* * * * *